United States Patent [19]
Morita et al.

[11] Patent Number: 5,963,344
[45] Date of Patent: Oct. 5, 1999

[54] IMAGE FORMING APPARATUS

[75] Inventors: Hideki Morita; Yoshiyuki Ichihara, both of Hachioji, Japan

[73] Assignee: Konica Corporation, Tokyo, Japan

[21] Appl. No.: 08/671,710

[22] Filed: Jun. 28, 1996

[30] Foreign Application Priority Data

Jul. 6, 1995 [JP] Japan ...................................... 7-170878
Jul. 26, 1995 [JP] Japan ...................................... 7-190597

[51] Int. Cl.⁶ .............................. H04N 1/04; H04N 1/46
[52] U.S. Cl. ........................ 358/482; 358/474; 358/494; 358/496; 358/513
[58] Field of Search ..................................... 358/482, 474, 358/494, 486, 496, 498, 483, 514, 513, 487, 497

[56] References Cited

U.S. PATENT DOCUMENTS

| | | | |
|---|---|---|---|
| 4,366,509 | 12/1982 | Norrell et al. | |
| 4,474,422 | 10/1984 | Kitamura . | |
| 5,091,978 | 2/1992 | Hirota . | |
| 5,251,047 | 10/1993 | Kizu et al. . | |
| 5,428,463 | 6/1995 | Goto | 358/482 |
| 5,483,053 | 1/1996 | Johnson et al. | 250/226 |
| 5,483,359 | 1/1996 | Yumiba et al. | 358/514 |
| 5,550,653 | 8/1996 | TeWinkle et al. | 358/514 |
| 5,587,814 | 12/1996 | Mihara et al. | 358/514 |

OTHER PUBLICATIONS

Patent Abstracts of Japan, vol. 018, No. 152 (E–1523), Mar. 14, 1994 & JP 05 328039 A (Ricoh Co., Ltd.), Dec. 10, 1993.

*Primary Examiner*—Edward L. Coles
*Assistant Examiner*—Mark Wallerson
*Attorney, Agent, or Firm*—Frishauf, Holtz, Goodman, Langer & Chick, P.C.

[57] ABSTRACT

An image processing apparatus includes a photoelectric conversion circuit for reading an original image by photoelectric-converting and for outputting an image signal, wherein the photoelectric conversion circuit is a dual channel register type separately outputting the image signal for odd numbered pixels and even numbered pixels; an analog-to-digital conversion circuit for converting the image signal to the image data which includes odd numbered pixel data for the odd numbered pixel and even numbered pixel data for the even numbered pixel; an image separation circuit for generating an odd numbered line data and an even numbered line data from the odd numbered pixel data and the even numbered pixel data, wherein the image separation circuit includes four line memories, and the odd numbered pixel data and the even numbered pixel data are synthesized to the odd numbered line data and an even numbered line data after the odd numbered pixel data and the even numbered pixel data are stored to each of the four line memories; and an outputting device for outputting an image based on the set of the odd numbered line data and the even line data.

9 Claims, 24 Drawing Sheets

FIG. 24

$C1A = L1 + \frac{1}{2}L2$ $C1B = \frac{1}{2}L2 + L3$ $C2A = \frac{1}{2}L1 + L2$ $C2B = L3 + \frac{1}{2}L4$ $\Rightarrow$ $\begin{cases} L1 = \frac{4}{3}C/A - \frac{2}{3}C2A \\ L2 = -\frac{2}{3}C/A + \frac{4}{3}C2A \\ L3 = \frac{2}{3}C/A + C/B - \frac{4}{3}C2A \\ L4 = -\frac{4}{3}C/A - 2\times C/B + \frac{8}{3}C2A + 2\times C2B \end{cases}$

IMAGE FORMING APPARATUS

BACKGROUND OF THE INVENTION

The present invention relates to an image processing apparatus wherein images are formed on an image carrier by providing image data in which original image signals were obtained by photoelectrically converting the original image with a solid-state image sensor was subjected to various image processes, and more particularly to an image processing apparatus wherein an increase in writing speed is attempted.

As a method to realize an increase in the speed of the image processing apparatus, a method to simply increase the frequency of clock may be considered. However, in such a method, there is a problem in that sufficient response characteristic between clock for a reading a solid-state image sensor and rotational frequency of a rotational polygon mirror constituting a writing device cannot be obtained due to a structural reason of the rotational polygon mirror so that a device to concurrently output two lines by using two laser diodes has been proposed.

FIG. 8 is a block diagram showing schematic constitution of an image processing apparatus wherein double line writing has been realized. FIG. 9 is a block diagram showing schematic constitution of the image processing circuit shown in FIG. 8. FIG. 10 is a time flow chart showing the relationship between an image processing unit used in a conventional image processing apparatus before and after frequency was converted.

As shown in FIG. 8, due to a structure of the above-mentioned image processing apparatus composed of dual channel registration type CCD (hereunder, simply referred to as "CCD") 1, A/D converters 2 and 3, synthesis circuit 4, image processing circuit 5, frequency conversion circuit 6 and PWM circuit 7 and 8, high speed writing becomes possible.

CCD 1 reads the original image signals of odd numbered pixels (hereunder, referred to as "odd pixel") and even numbered pixels (hereunder, referred to as "even pixel"), and then, send them to A/D converter 2 and 3. The A/D converter provides the original image signals with A/D conversion processing, and then, sends them to synthesis circuit 4. After synthesis circuit 4 synthesizes odd pixel image data and even pixel image data, they are converted to continuous pixel data, and then, they are sent to image processing circuit 5. Image processing circuit 5 conducts several types of necessary image processing, for example, luminance to density conversion, enlargement or reduction processing and spacial filtering so as to send the image data to frequency conversion circuit 6, which is for example, constituted of a spacial filter which converts the spacial frequency characteristic of image information as shown in FIG. 9. In order to conduct a matrix operation of 5×5 lines, the spacial filter conducts operations using image information for 5 continuous lines using line memories 11 through 14. Frequency conversion circuit 6 writes image data after subjecting the spacial frequency conversion successively in line memories 21 through 24 for synchronizing with the writing frequency of a writing device. The data are concurrently read in combination of line memories 21 and 23 and line memories 22 and 24, and are then sent to PWM circuits 7 and 8. PWM circuit 7 and 8 independently provide pulse width modulation, and record concurrently for 2 lines by means of double laser diode.

In FIG. 10, CONT with WCLK is a timing signal obtained through a revolving polygonal mirror constituting a writing device synchronously with clock for writing. It also shows one scanning duration for writing one scanning line of about 4700 pixels. CONT with CLK is a timing signal which is synchronous with the clock for image processing. It is a reading timing signal for the image sensor. It indicates reading direction of one scanning line of about 4700 pixels. As described above, image data from the image reading device are ordinarily outputted on a line basis synchronously with a clock. Speed for image-processing the above-mentioned pixel data is determined by the above-mentioned clock. Here, if image data for two lines are recorded concurrently by a double laser diodes, the frequency of WCLK is lower compared to that of CLK. For example, when 25 MHz is selected as the clock frequency for image processing, clocks CLK2 for odd data and even data when A/D are converted are respectively 12.5 MHz. In addition, as a clock WCLK for writing, a clock of about 16 MHz is selected.

To realize a further speed increase, the frequency of clock CLK for image processing must be further raised. The upper limit of the operation speed of image operation elements and that of operation speed of the line memory used for image processing is around 30 MHz in ordinary cases. It is difficult to operate them at higher frequency. In addition, the higher the frequency is, the electro-magnetic interference problem (EMI) becomes more serious.

In addition, the present invention relates to an apparatus in which reading of an original is done in two dimensions by the use of one-dimensional image sensor.

Heretofore, an image reading apparatus obtaining two-dimensional electrical image information by means of the above-mentioned one-dimensional image sensor, wherein the above-mentioned one-dimensional image sensor and the original are relatively shifted to the secondary scanning direction (the direction which crosses the pixel row of the one-dimensional line sensor at a right angle), while the original is scanned in the primary scanning direction by means of the one-dimensional image sensor (line sensor) (see Japanese Patent Publication Open to Public Inspection.

Here, operation of standard one-dimensional CCD sensor (CCD line sensor) will be explained referring to FIGS. 21 and 22.

As shown in FIG. 21, the CCD line sensor is composed of a photo-diode which senses light, shift gates 1 and 2 which shift charge in proportion to the light amount accumulated in aforesaid photo-diode and CCD analog shift registers 1 and 2 for outputting charge serially shifted through the above-mentioned shift gate. Incidentally, in the CCD line sensor shown in FIGS. 21 and 22, effective pixel number is 2048 pixels.

Encircled numerals (1, 2, 3, 4, 5, 6, 19, 20, 21 and 22) respectively in FIGS. 21 represent the CCD pin numbers.

When control signal (shift pulse) SH is at a high level, charge accumulated in the photo-diode is transferred in parallel to CCD analog shift registers 1 and 2 through shift gates 1 and 2. Following this, charge wherein CCD analog shift registers 1 and 2 were read at clock Ø1 and Ø2 for shift are serially shifted and outputted to OS. This OS outputting is image data corresponding to one line.

Namely, outputting for one line is obtained for every one cycle of control signal SH. Cycle (outputting cycle for one line) of the above-mentioned control signal SH necessitates outputting time for one line (the time necessary to serially output for one line) or more.

In order to output all charges transferred from photo-diode of CCD analog shift registers 1 and 2 to OS, in an example of FIGS. 21 and 22, 2124 clocks are necessary as 2124 pixels, i.e., the clock number of Ø1 and Ø2. Time which corresponds to these 2124 clock is time for outputting one line.

Here, the maximum reading speed per line of CCD is determined by the maximum operation frequency of Ø1 and Ø2 and the number of photo-diode. For example, if 5000 pixels are read by one line with operation of 20 MHz, it takes at least 250 µs (in the case of a single channel) for reading one line. These 250 µs are the outputting time for one line. In the above-mentioned example, when the 250 µs is a cycle of control signal SH, it is necessary to set 254 mm/s for the conveyance speed in the secondary scanning direction in order to read the original with 400 dpi in the secondary scanning direction.

As described above, in the case of an image reading apparatus employing a one-dimensional CCD sensor, reading speed can be determined by the operation frequency of the CCD and the number of photo-diodes. In order to increase reading speed, it is necessary to further increase operation frequency. However, since there is a limit to operation frequency, in order to further increase the speed, it is necessary to sacrifice resolution. So far, it was difficult to be compatible high resolution and high speed reading.

As a method to realize high speed reading without sacrificing resolution, as shown in FIG. 23, there is a method to reduce the reading time by the CCD line sensor to ¼, by arranging 4 CCD line sensor alternately in the primary scanning direction for parallel processing.

However, due to this method, the CCD line sensors are positioned alternately in the primary direction. Accordingly, this resulted in a problem of complicated image processing being necessary for obtaining image data for one line by synthesizing a connection portion between each CCD line sensor without disorder feeling.

In addition, in the case of digital copying machines, enlargement and reduction in the secondary scanning direction may be realized by changing conveyance speed. In such cases, space between each CCD line sensor in the secondary scanning direction is not a constant line number. Accordingly, another problem surfaced in that complicated image processing became necessary in response to magnification (conveyance speed).

SUMMARY OF THE INVENTION

A first object of the present invention is to provide an image processing apparatus wherein two image processing circuits are prepared parallelly so that concurrent processing can be conducted and thereby doubled processing speed can be obtained at a lower frequency.

In addition, to further increase practicality of an image processing apparatus:

A second object is to attain reading original two-dimensionally by the use of a one-dimensional image sensor with high resolution and high speed, not necessitating complex image processing.

The first object of the present invention is attained by either of the following embodiments.
(1) To provide a photoelectric conversion circuit wherein an original image is read due to photoelectric conversion, an A/D conversion circuit wherein an original signal from aforesaid photoelectric conversion circuit is subjected to AD conversion for outputting image data, an image separation circuit which divides image data into two groups, i.e., odd lines and even lines, for sending, two sets of image processing circuit which parallelly processes two outputted data from aforesaid image separation circuit and a writing apparatus which writes images by means of image data from aforesaid image processing circuit.
(2) The image processing apparatus described in item (1) above, wherein the above-mentioned photoelectric conversion circuit is a dual channel register type separately outputting odd pixels and even pixels and odd pixel data and even pixel data in which data from the above-mentioned image separation circuit were independently subjected to A/D conversion are divided into two groups, i.e., odd lines and even lines, by the use of line memories for 4 lines while synthesizing odd data and even data.
(3) The image processing apparatus described in item (2) above, wherein, among plural line memories constituting the above-mentioned image separation circuit, odd pixels are written in the first line memory and the second line memory and even pixels are written in the third line memory and the fourth line memory, image data for odd lines are produced by reading image data from the first line memory and the third line memory for synthesizing and image data for even lines are produced by reading image data from the second line memory and the fourth line memory for synthesizing.
(4) The image processing apparatus described in either item (1), (2) or (3) above, wherein an identical frequency clock controls the above-mentioned A/D conversion circuit through the image processing unit.
(5) An image processing circuit in which image data of at least two adacent lines are concurrently inputted and which has a structure in which two or more image operation elements realizing the same function share line memory for keeping image data separate from each other in order to conduct operation in reference to a pixel aggregate of N pixels×L lines (N and L are natural numbers) as image processing.
(6) An image processing apparatus equipped with an image processing circuit which parallelly processes odd lines and even lines and a writing device which conducts image recording using two laser diodes in accordance with data outputted from aforesaid image processing circuit, wherein a laser diode for odd lines is controlled based on odd line data outputted from the above-mentioned image processing circuit and a laser diode for even lines is controlled based on even line data.
(7) The image processing apparatus described in item (6) above, wherein at least two or more lines are provided for a line memory for odd lines and a line memory for even lines and image data synchronizing with a clock for image processing used in the above-mentioned image processing circuit is converted to a clock for recording which also controls laser diodes constituting the above-mentioned writing device.
(8) The image processing apparatus described in any of items (2), (3), (5) or (7) above, wherein the above-mentioned line memory is a FIFO (first-in and first-out) memory.

Due to the embodiments described in items (1) through (8) above, doubled processing speed can be obtained compared to clock for pixel transferring by dividing image data from the image reading apparatus and by processing them respectively. In addition, line memory can be saved by sharing line memory for odd lines and line memory for even lines, with regard to image processing conducting a matrix operation of N pixels×M lines such as spacial filter.

The first embodiment for attaining the above-mentioned second object is an image reading apparatus which obtains two-dimensional original image information due to the above-mentioned one-dimensional image sensor by moving aforesaid image sensor and the original relatively in the secondary scanning direction while the original is scanned in the primary scanning direction by a one-dimensional image sensor, wherein the element rows of two or more one-dimensional image sensor is positioned parallelly, image reading by means of each one-dimensional image sensor is concurrently conducted and one-dimensional image sensors read images located in different lines from each other in the secondary scanning direction.

Due to the above-mentioned structure, plural one-dimensional image sensors located parallel to each other in the secondary scanning direction are caused to read different lines. Therefore, reading speed in the secondary scanning direction can be increased without reducing resolution compared to cases when different lines are read by a single one-dimensional image sensor.

For example, if an image reading apparatus is equipped with two one-dimensional image sensors wherein one of the two one-dimensional image sensor reads odd lines and the other of two one-dimensional image sensor reads even lines and reading speed in the secondary scanning direction is increased to double compared to the case when one sensor is used, resolution of the synthesized image data in the secondary scanning direction is the same as that before reading speed was changed, though resolution in the secondary scanning direction by each of the one-dimensional image sensor is reduced to half. Consequently, it is possible to increase reading speed without sacrificing resolution.

The second embodiment is structured in which each of the above-mentioned image sensors are positioned shifted corresponding to one line in terms of optically prescribed resolution.

Due to the above-mentioned structure, even if reading timing by each of one-dimensional image sensors is the same, each of one-dimensional image sensors reads a different line. For example, in the case of employing two one-dimensional image sensors, if an optical image on an odd line is formed for one of one-dimension line sensors while an optical image on an even line is formed corresponding to an adjoining line at a prescribed resolution, image data of odd lines and image data of even lines can concurrently be obtained due to parallel processing by each of the one-dimensional image sensors. Accordingly, reading speed can be increased while a prescribed resolution is kept.

The third embodiment is a structure in which the same optical image is formed on each of the above-mentioned one-dimensional image sensors, wherein each of the one-dimensional image sensors reads positions which are shifted each other by one line in terms of an optically prescribed resolution by shifting reading timing of each of the above-mentioned one-dimensional image sensors.

Due to the above-mentioned structure, the same optical image in terms of optics is formed on each of the above-mentioned image sensor. However, since reading timing is shifted, each sensor does not read the same line. They read adjacent lines at a prescribed resolution, attributing to improvement of reading speed.

In the fourth embodiment, due to a combination of the optical location shift in each of the above-mentioned one-dimensional image sensors and reading timing shift of each one-dimensional image sensor, each of the above-mentioned one-dimensional image sensor reads positions shifted each other by one line in terms of a prescribed resolution.

Due to the above-mentioned structure, reading speed can be improved since each of the one-dimensional image sensors reads lines one by one at a prescribed resolution due to shifting of the optical position by each of the one-dimensional image sensors and shifting of reading timing.

The fifth embodiment is structured in which light reflected from the original forms images on plural one-dimensional image sensors through a half mirror.

Due to the above-mentioned structure, a part of the entering beam is reflected by means of a half mirror and another part of it is transmitted so that read images can simply be formed on a plural one-dimensional image sensor.

The structure of the sixth embodiment is that the scanning speed in the above-mentioned secondary scanning direction is n times the speed at which a prescribed resolution can be obtained with one one-dimensional image sensor and outputting corresponding with each line at a prescribed resolution is calculated based on outputting from each of the above-mentioned one-dimensional image sensors.

Due to the above-mentioned structure, even if charge accumulation time corresponds to plural lines in conversion to a prescribed resolution in the secondary scanning direction by increasing conveyance speed (scanning speed) in the secondary scanning direction, outputting of each line at a prescribed resolution can be calculated from outputting by each of the one-dimensional image sensors in accordance with a correlation of lines respectively read by each of the one-dimensional image sensors. As a result, blurless images can be obtained.

In the 7th embodiment, each of the above-mentioned one-dimensional image sensor is a CCD line sensor equipped with a shutter function. Due to this shutter function, accumulation time of optical signals is limited shorter than the outputting frequency for one line.

Due to the above-mentioned structure, by increasing the conveyance speed (scanning speed) in the secondary scanning direction, charge accumulation time in each of the one-dimensional image sensors (a CCD line sensor equipped with shutter function) corresponds to plural lines in conversion to a prescribed resolution in the secondary scanning direction. That the above-mentioned factor becomes the cause of blurring can be avoided by limiting substantial charge accumulation time shorter due to the above-mentioned shutter function.

DESCRIPTION OF THE DRAWINGS

FIG. 24 is a drawing showing characteristics when reading positions are shifted by ½ line.

PREFERRED DESCRIPTION OF THE PREFERRED EMBODIMENT

An example for attaining the first object will be explained hereinafter.

Image data constituting one page are two-dimensional data constituted of N pixels in the primary scanning direction and L lines in the secondary scanning direction. When an A3-size original is read at a resolution of 400 dpi, one page is constituted of 4677 pixels of N and 6617 lines of L.

Figure 5:
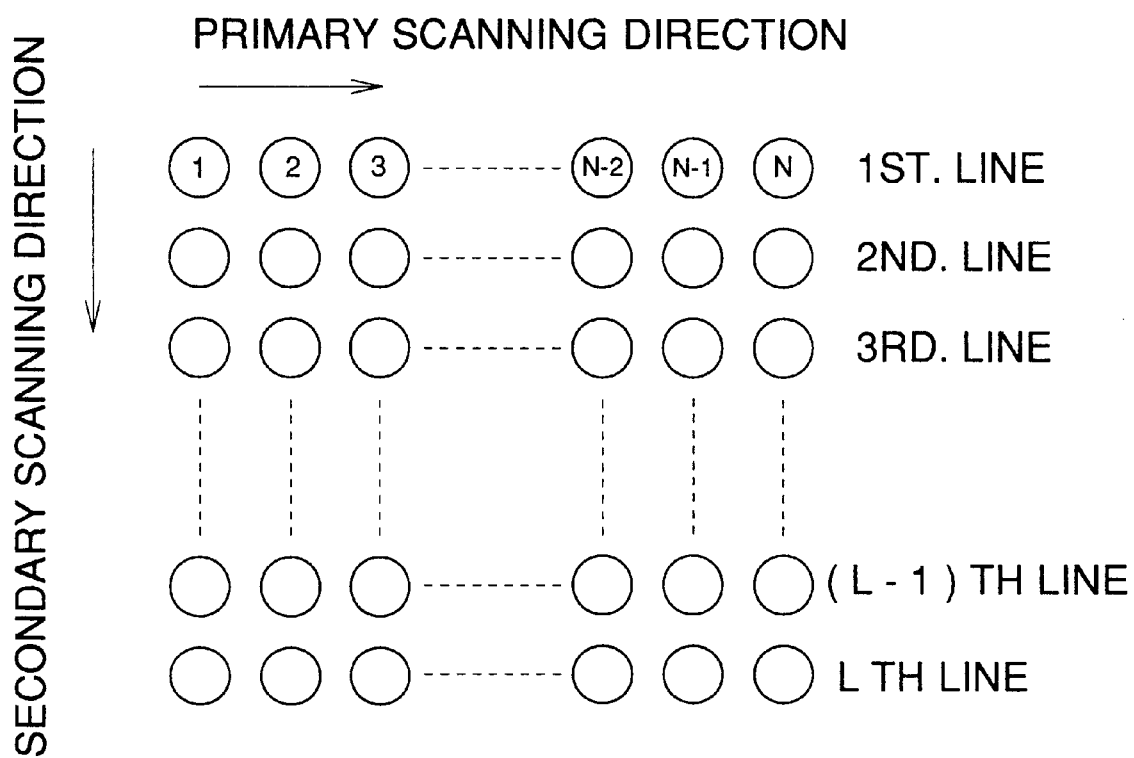
FIG. 5 is a drawing showing reading and scanning of the original image.

Here, "odd pixel", "even pixel", "odd line" and "even line" which are used hereunder will be explained. The first pixel of adjoining pixels is defined as an "odd pixel", and any adjacent pixel is defined to be an "even pixel". In FIG. 5, when N is even, first pixel, third pixel, . . . , (N−1)th pixel are called odd pixels, and 2nd pixel, 4th pixel, . . . , Nth pixel are called even pixels.

In addition, the first line of adjacent lines is defined to be an "odd line", and any adjacent line is defined to be an "even line". In FIG. 5, when L is even, the first line, third line, . . . , (L−1)th line are called odd lines, and the 2nd line, 4th line, . . . , Lth line are called even lines.

Figure 1:
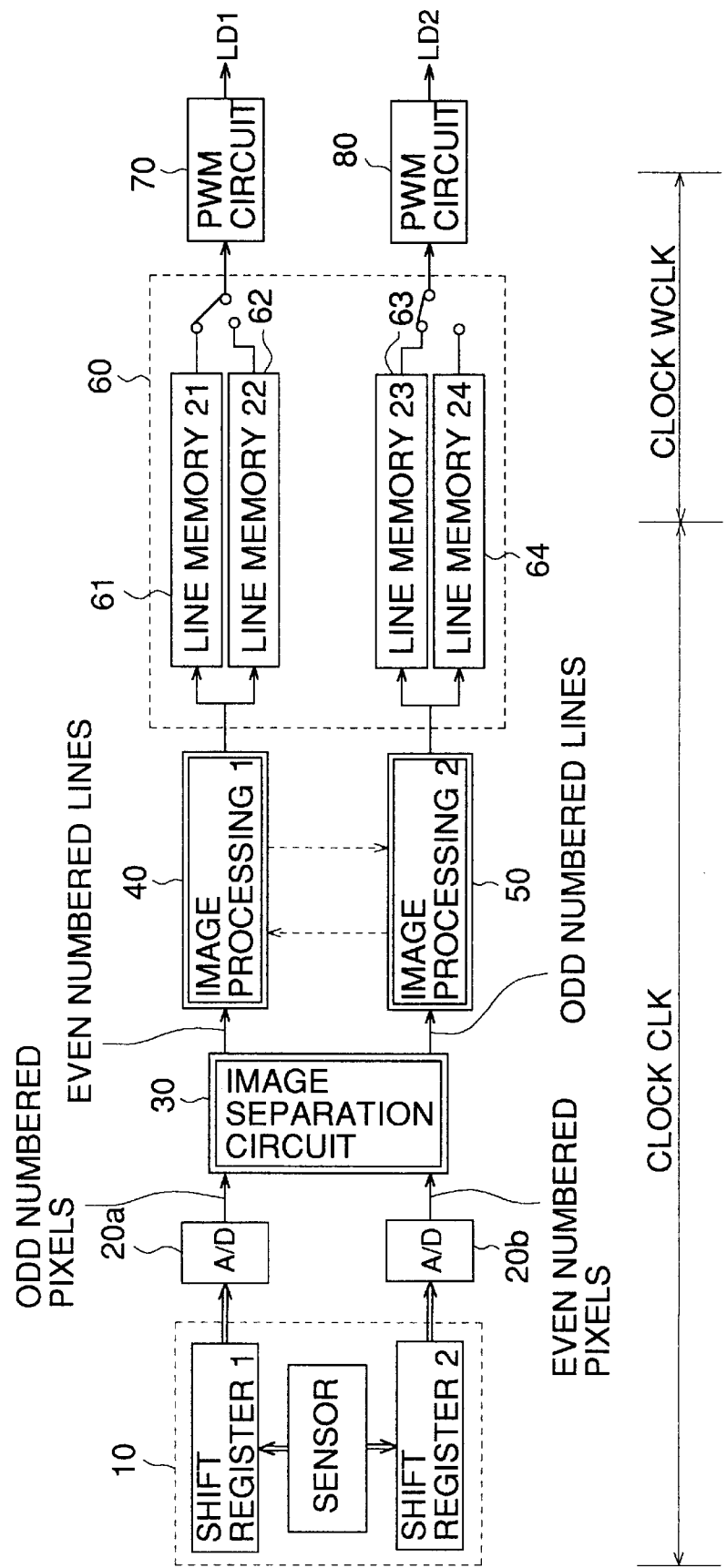
FIG. 1 is a block diagram showing an example of the image processing apparatus of the present invention.

FIG. 1 shows a block diagram showing an example of the image processing apparatus of the present invention.

The image processing apparatus of the present invention is composed of a dual channel registration type CCD 10, A/D converters 20a and 20b, image separation circuit 30, image processing circuits 40 and 50, frequency conversion circuit 60, PWM circuits 70 and 80 and semi-conductors LD1 and LD2, by which high speed writing can be conducted by writing 2 lines concurrently. Hereunder, the constitution of each unit will be explained.

As a means for photoelectrically transferring image information, odd number pixels and even number pixels are concurrently read and are inputted into an image separation circuit after A/D conversion, using a dual channel registration type CCD. Shading correction which corrects scattering of light amount of a photoelectric conversion unit may be conducted before or after the image separation circuit. Odd number data and even number data, separated by the image separation circuit, are respectively inputted in two sets of image processing blocks. After identical processing is provided, they are inputted in an image outputting unit.

In the image outputting unit, odd lines and even line are concurrently written by two laser diodes. In accordance with the image data, aforesaid laser diodes are driven by a signal subjected to pulse width modulation (PWM) by PWM circuits 70 and 80. It is common that standard clock WCLK for driving the laser and the clock CLK in the image processing unit are different. Accordingly, signals in which image data is synchronized with clock CLK for image processing are converted to signals in which image data is synchronized to clock WCLK for image writing in a frequency conversion processing unit wherein 2 sets of line memory for 2 lines are prepared. Conversion method is as follows: odd line data and even line data are written by utilizing clock CLK in line memory 21 and line memory 23 respectively. The foregoing odd line data and even line data which were already written are read with clock WCLK from other line memory 22 and line memory 24 respectively. For the adjacent lines, each line data is written in line memory 22 and line memory 24 and read from line memory 21 and line memory 23.

Incidentally, FIG. 1 illustrates a scope from reading unit to writing unit. In addition, an apparatus wherein images are temporarily stored in the image memory without providing a separate writing device or a separate image processing apparatus wherein images are inputted from outside without providing a reading unit may effectively process an image processing circuit.

Figure 2:
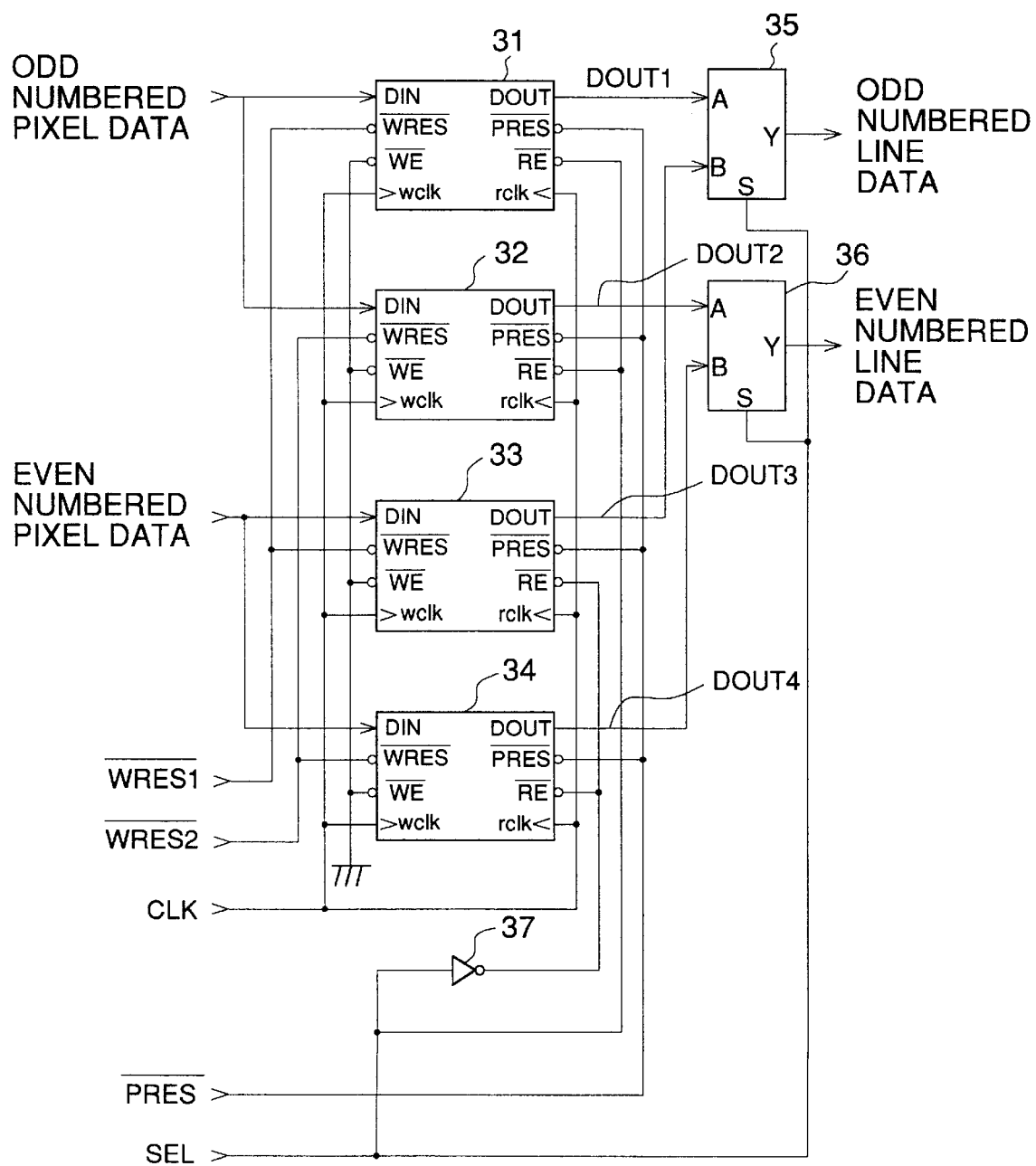
FIG. 2 is a block diagram showing a practical example of an image separation circuit.

FIG. 2 is a block diagram showing a practical example of an image separation circuit.

Image separation circuit 30 is constituted of line memories 31 through 34, selectors 35 and 36 and NOT circuit 37 for outputting odd line data and even line data. Each function will now be explained as follows.

Line memories 31 through 34 are FIFO, in which data which is written concurrently with data which has already been written are read. Line memories 31 and 32 input odd number pixel data to data inputting terminal DIN. Line memories 33 and 34 input even pixel data to data inputting terminal DIN. Output terminals DOUT of line memories 31 and 33 are connected to input terminals A and B of selector 35 respectively. Output terminals DOUT of line memories 32 and 34 are connected to input terminals A and B of selector 36 respectively. Output data DOUT 1 and 3 are data for odd lines, and output data 2 and 4 are data for even lines.

CLK functions as writing clock wclk for line memory and also functions as reading clock rclk. PRES is a signal for resetting the internal address counter for reading line memories 31 through 34. WRES1 and WRES2 are signals for resetting the internal address counter for writing line memories 31 through 34.

Signal SEL selects reading line memory, in which logic is reversed in NOT circuit 37, and then, inputs into line memories 33 and 34.

Selectors 35 and 36 selectively send data DOUTs 1 and 2 corresponding to odd pixels when the signal SEL is at level "0", and also selectively send data DOUTs 3 and 4 corresponding to even pixels when the signal SEL is at level "1", in which odd line data and even line data are produced by selectively outputting signals SEL alternately by switching the level so that the signal SEL is sent to image processing circuits 40 and 50.

Next, operation of image separation circuit 30 will now be explained in detail.

Figure 3:
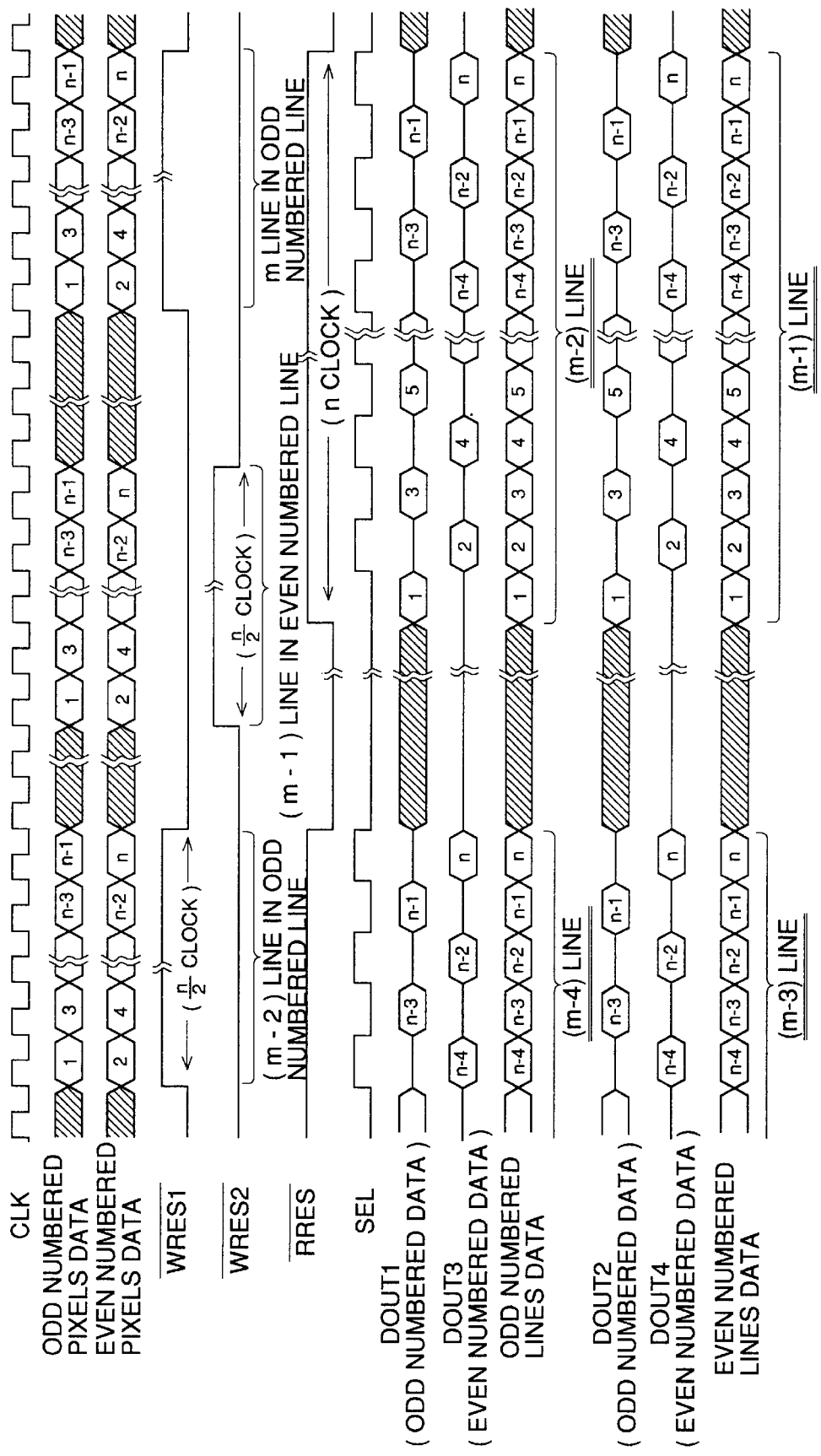
FIG. 3 is a timing chart showing operation timing of the image separation circuit.

FIG. 3 is a time chart showing operation timing of the image separation circuit.

Odd pixel data and even pixel data are inputted synchronously with clock CLK. Suppose the number of pixels for one line is n, the number of pixels for each n/2 corresponds to one line. For an odd line, WRES 1 is set to be disabled (high level), in which odd line data is written in line memories 31 and 33 while internal address counter for writing is being counted up synchronously with CLK. Odd pixel data are written in line memory 31, and even pixel data are written in line memory 33. Disable duration of WRESs 1 and 2 is n/2 clock. For the next even line, WRES 2 is set to be disabled (high level), in which even line data is written in line memories 32 and 34 while internal address counter for writing is being counted up synchronously with CLK. Odd pixel data are written in line memory 32, and even pixel data are written in line memory 34. Timing control is conducted in such a manner that PRES is set disabled (high level) while an even line is written, the address counter for reading is started counting up in accordance with the sel signal and PRES is returned to be active (low level) before writing duration of the next odd line is completed so that data which have already been written are read. Active duration is an "n" clock width. Data in line memories 33 and 34 (odd pixels) are read when a signal SEL is at a low level, and data in line memories 35 and 36 (even pixels) are read when the signal SEL is at a high level. By switching the above-mentioned data by selectors 35 and 36, odd line data and even line data are obtained. Due to the above-mentioned processing, the A/D conversion unit of the image processing unit can be controlled under the same clock frequency. Operation speed can equivalently obtain double the performance of clock CLK.

For processing the image processing circuit parallelly, spatial filtering processing which converts spacial frequency characteristics of image information processes, in the case of independent processing each other, only odd lines when the referential line in the secondary scanning direction is an odd line, and even lines when the referential line in the secondary scanning direction is an even line. Therefore, processing must be conducted with sporadically creating the problem that the intrinsic spacial frequency characteristics cannot be obtained. In order to overcome the above-mentioned problem, odd and even line data are shared as shown in FIG. 4.

Figure 4:
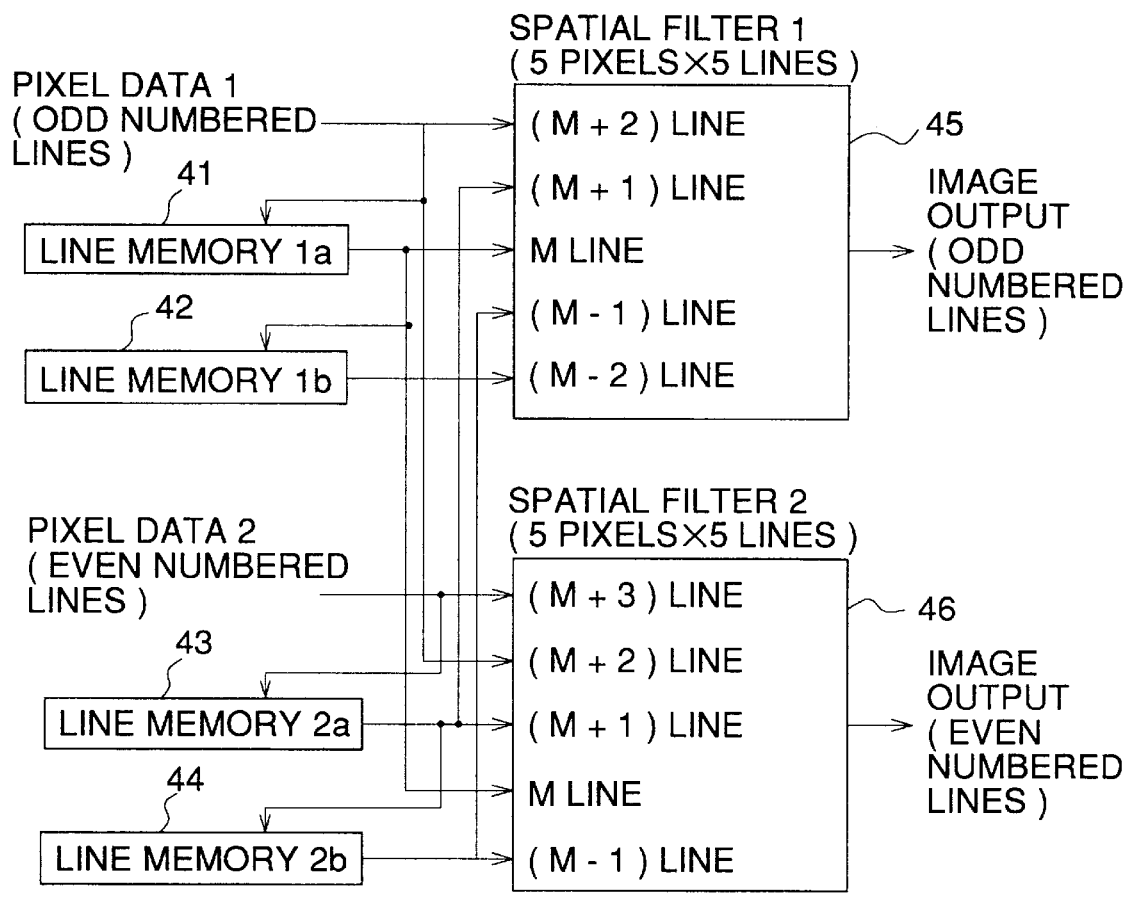
FIG. 4 is a block diagram realizing (5×5) space filter processing.

FIG. 4 is a block diagram realizing (5×5) spacial filtering processing.

When image data of (M+2)th lines are inputted from pixel data 1 (odd line data), data of Mth line written in advance is read from line memory 41. From line memory 42, data of (M−2)th line are read. In the same manner, from pixel data 2 (even line data), image data of (M+3)th line are inputted. From line memories 43 and 44, data of (M+1)th line and (M−1)th line are respectively read. By inputting the above-mentioned data into the inputting unit corresponding to space filters 45 and 46, expected spacial filtering processing can be conducted. Here, (5×5) spacial filtering processing was explained. However, it goes without saying that the above-mentioned theory is effective for conducting (N×L) [where N and L: natural numbers] spacial filtering processing or other matrix operations.

Figure 6:
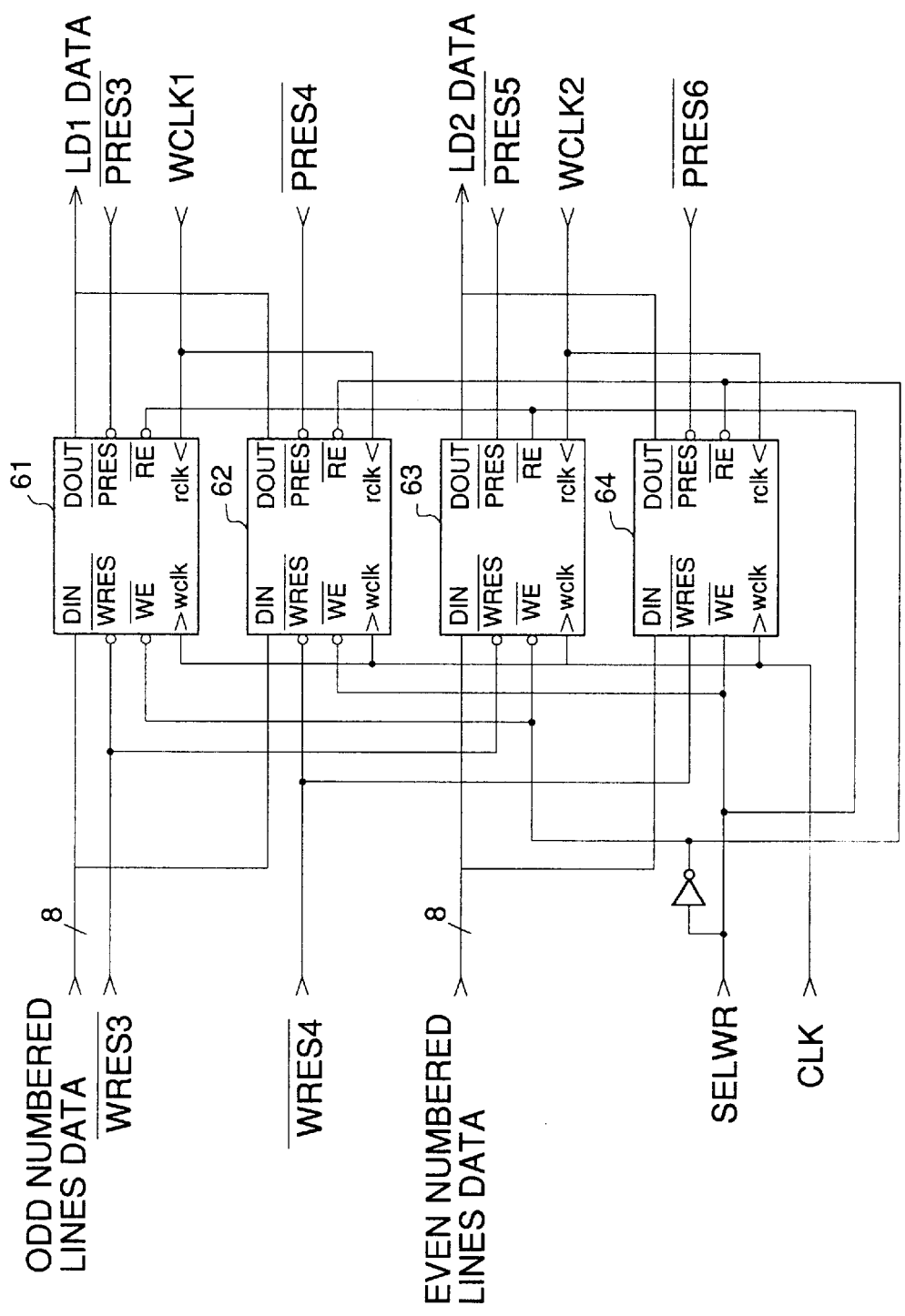
FIG. 6 is a block diagram showing a practical example of a frequency conversion circuit.

FIG. 6 is a block diagram showing a practical example of a frequency conversion circuit.

Into line memories 61 through 64, image data are written synchronously with clock CLK for image processing. WRES 3 and WRES 4 become disabled (at high level) alternately for effective pixel separation (for example, 4677 pixels) in a line unit. It is so controlled that they are counted up for internal writing in line memories 61 through 64, where odd line data and even line data are written in line memories 61 and 63 for one being and odd line data and even line data are written in line memories 62 and 64 for either adjacent line.

Figure 7:
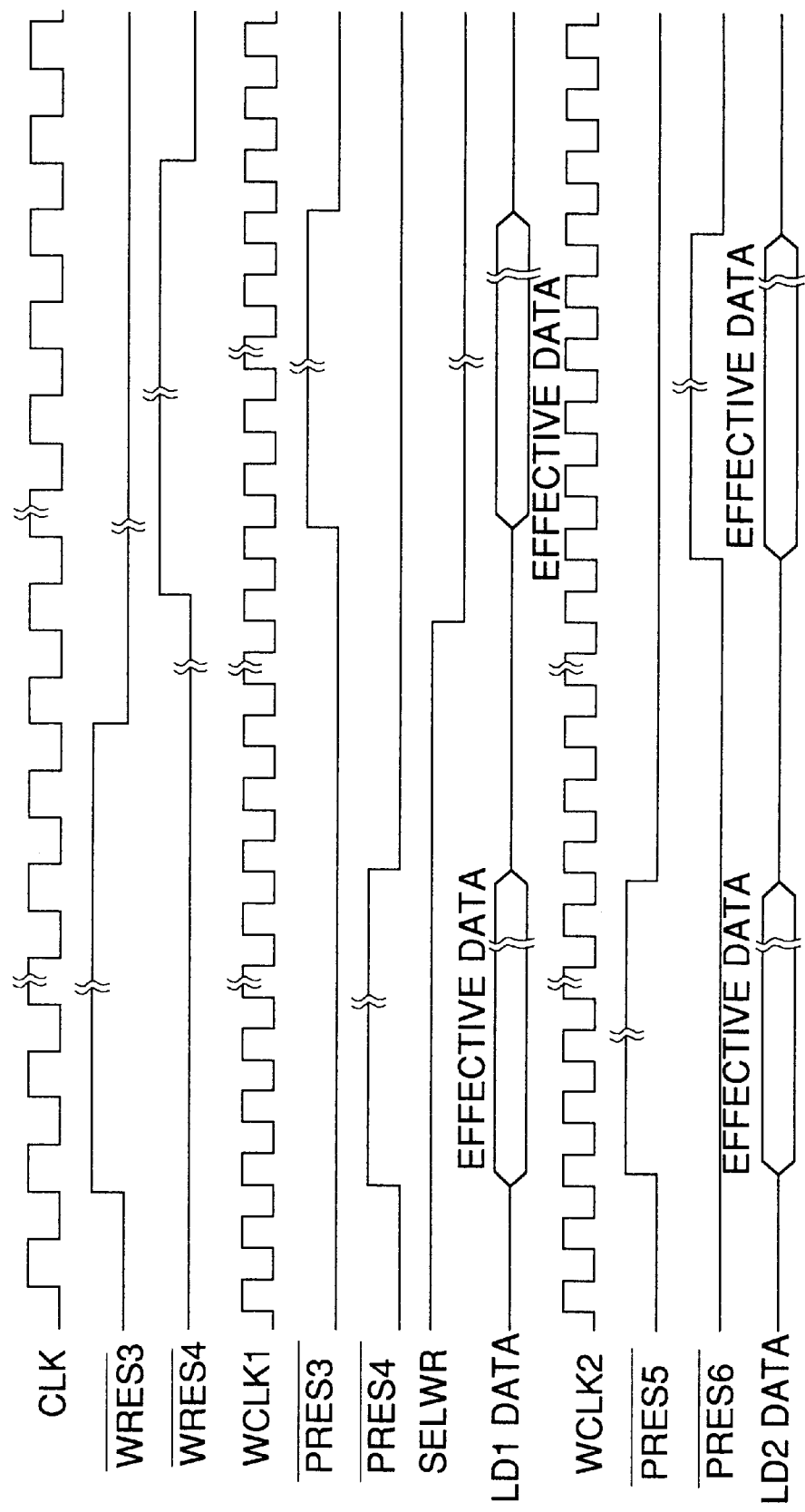
FIG. 7 is a timing chart showing operation of the frequency conversion circuit.
Figure 8:
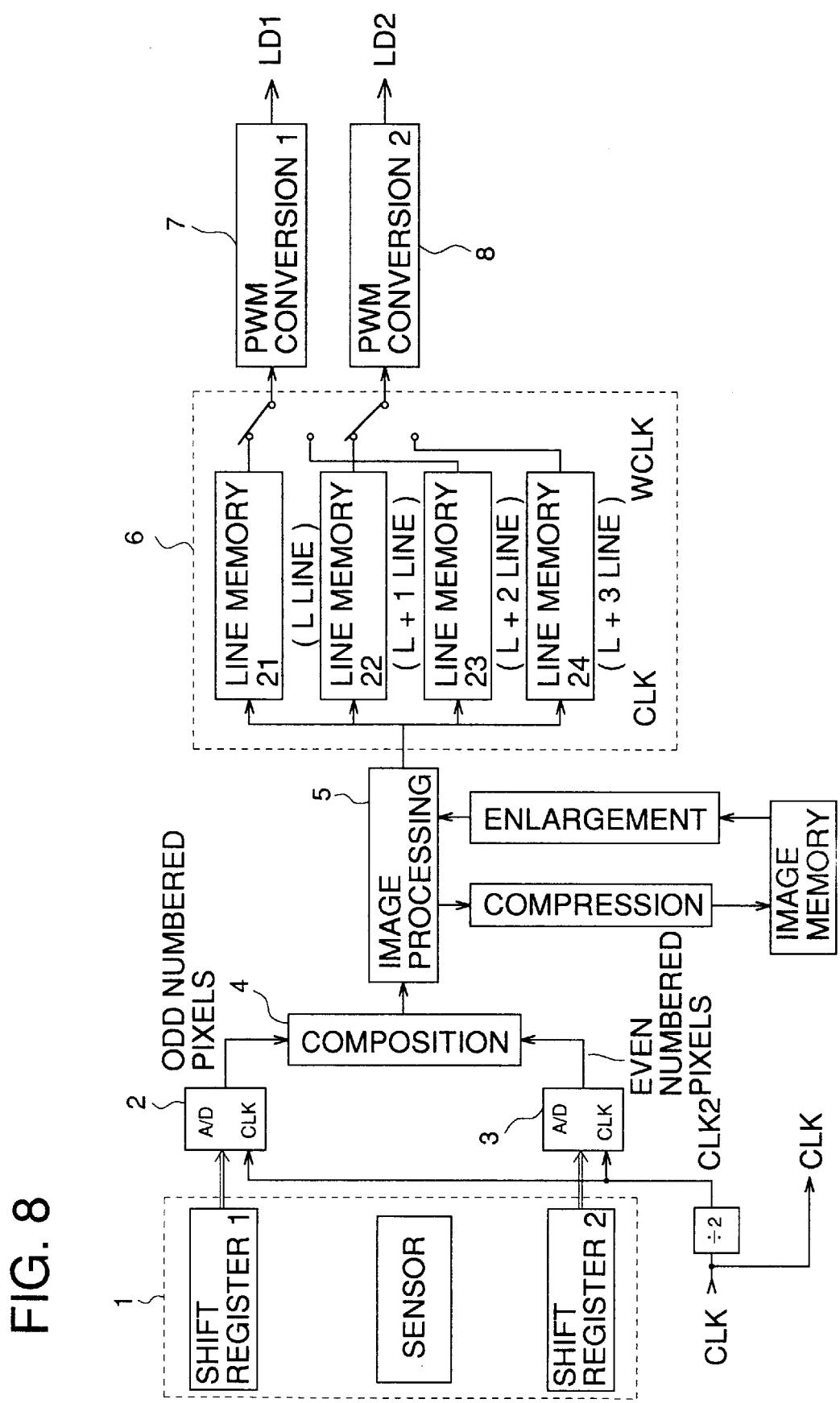
FIG. 8 is a block diagram showing a schematic constitution of an image processing apparatus wherein two line writing has been realized.
Figure 9:
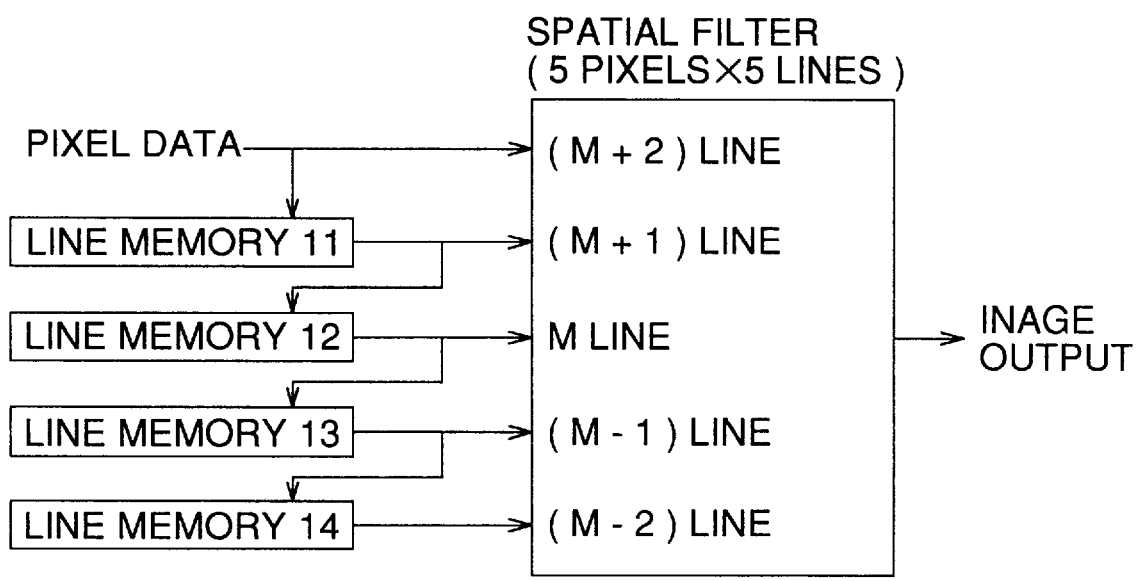
FIG. 9 is a block diagram showing schematic constitution of the image processing circuit.
Figure 10:
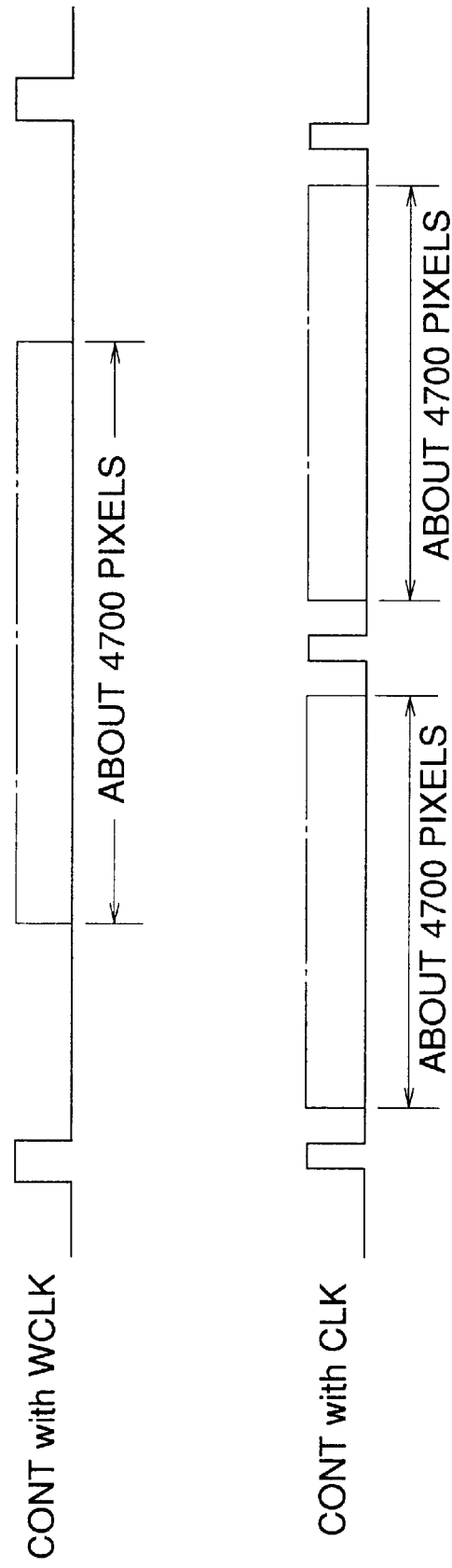
FIG. 10 is a time chart showing the phase relationship of clock used for a conventional image processing apparatus.

FIG. 7 is a timing chart showing operation of the frequency conversion circuit shown in FIG. 6.

As a clock for reading line memories 61 through 64, WCLK is used. FIG. 7 shows a case in which WCLK 1 is used as a standard clock for modulating semi-conductor laser LD1 and WCLK 2 is used as a standard clock for modulating semi-conductor laser LD2. WCLK 1 and WCLK 2 are clocks of the same frequency wherein their phases are relatively changed due to the position relationship of the scanning direction of semi-conductor lasers LD1 and LD2.

PRESs 3 and 4 are generated synchronously with WCLK1, and controlled in such a manner that they become disabled (high level) alternately for the duration of effective pixel numbers (for example, 4677 pixels) on one line unit, counting for internal reading in the line memory (FIFO) advances so that even line data are read from line memory 61 and line memory 62 is read in the next line.

In the same manner, PRESs 5 and 6 are generated synchronously with WCLK2, and controlled in such a manner that they become disabled (high level) alternately for the duration of effective pixel numbers (for example, 4677 pixels) on one line unit, the counter for internal reading in line memory (FIFO) is activated so that even line data are read from line memory 63 and line memory 64 is read in any adjacent line.

Terminals RE in line memories 61 and 62 control DOUT enable during low level duration, and also control it tristate during high level duration. Therefore, by controlling the outputted signals from line memories 61 and 62 alternately enabled at SELWR, data for a semi-conductor laser LD1 is read. In the same manner, outputted signals from line memories 63 and 64 are controlled to be enabled alternately so that data for semi-conductor laser LD2 is read.

By providing the above-mentioned structure, image processing wherein two lines are processed concurrently can be conducted. Therefore, the present invention can attain double processing speed compared to clock for image transferring. As a result, doubled operation speed compared to the highest operation speed of an operation element can be obtained. In addition, due to sharing the line memories, the above-mentioned speed can be attained while the number of line memory is almost the same as for conventional numbers.

Hereinafter, examples for attaining the second object of the present invention will be explained.

Figure 11:
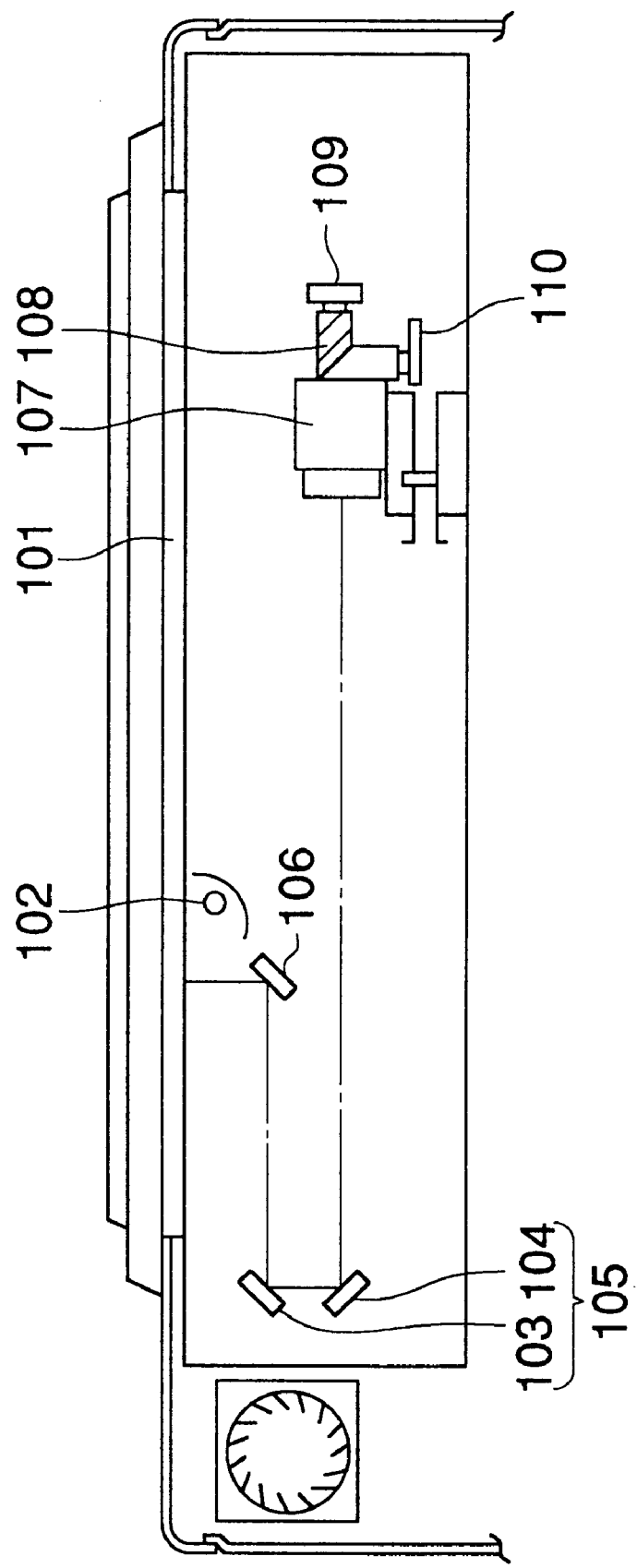
FIG. 11 is a drawing showing an embodiment of the optical system of the image reading device.

FIG. 11 is a block diagram showing an optical system of an image reading apparatus.

In FIG. 11, the original for reading is placed on original glass stand 101, and is subjected to optical scanning by halogen light source 102 which moves in the right and left direction (the secondary scanning direction)

In combination with mirror 106 provided on the above-mentioned halogen light source 102, movable mirror unit 105 composed of two mirrors 103 and 104 leads reflective light (optical image) from the original on original glass stand 101 to lens 107.

Figure 12:
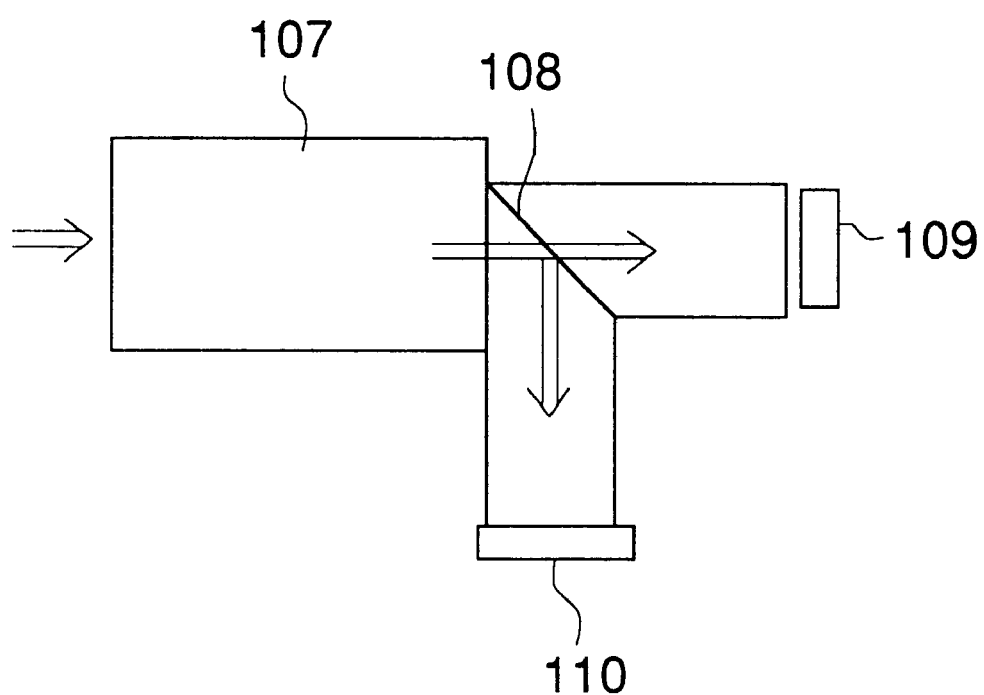
FIG. 12 is a part enlarged view of the optical system shown in FIG. 11.

As shown in FIG. 12, the optical image of the original entered from lens 107 to half mirror 108 is divided into two directions by means of half mirror 108. Each of the divided optical images respectively image-forms on first CCD line sensor 109 and second CCD line sensor 110 wherein element rows of each CCD line sensor are aligned in the secondary scanning direction.

First CCD line sensor 109 and second CCD line sensor 110 are provided with plural photo-diode all through the reading region in a direction penetrating the paper surface (the primary scanning direction) in FIGS. 11 and 12.

The interval in the secondary scanning direction on reading data by the above-mentioned first CCD line sensor 109 and second CCD line sensor 110 is arranged to be just one line. Each line sensor may be positioned in such a manner that secondary scanning of them may be shifted for one line or may be positioned in such a manner that they read the same position (the same optical images are formed) so that data shifting by one line may be read by altering reading timing by a method described later.

Figure 13:
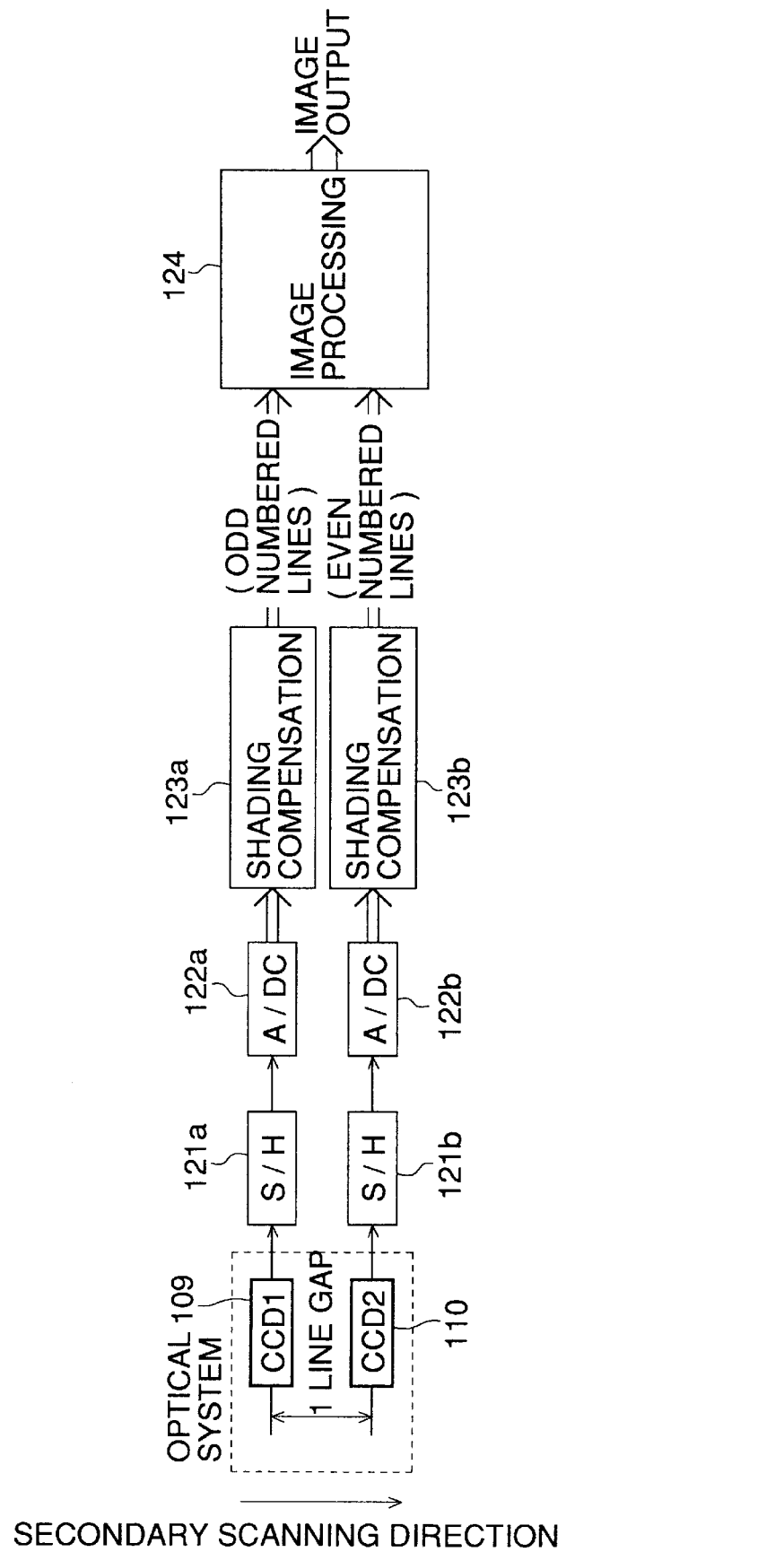
FIG. 13 is a block diagram showing an embodiment of the image processing system.

FIG. 13 shows an image processing system based on the above-mentioned two CCD line sensors 109 and 110.

Outputted data from the above-mentioned CCD line sensors 109 and 110 are, after being subjected to analogue processing in sample holding circuit (S/H) 121a and 121b, subjected to A/D conversion by A/D converters 122a and 122b, and then also subjected to shading correction by shading correction circuits 123a and 123b.

Next, each outputting is assigned to an odd line or an even line. Following this, they are subjected to various image processing in image processing circuit 124, and then outputted. Outputting after image processing may be subjected to printing processing in a laser writing system or an electrophotographic process, or may temporally be stored in the image memory.

Figure 14:
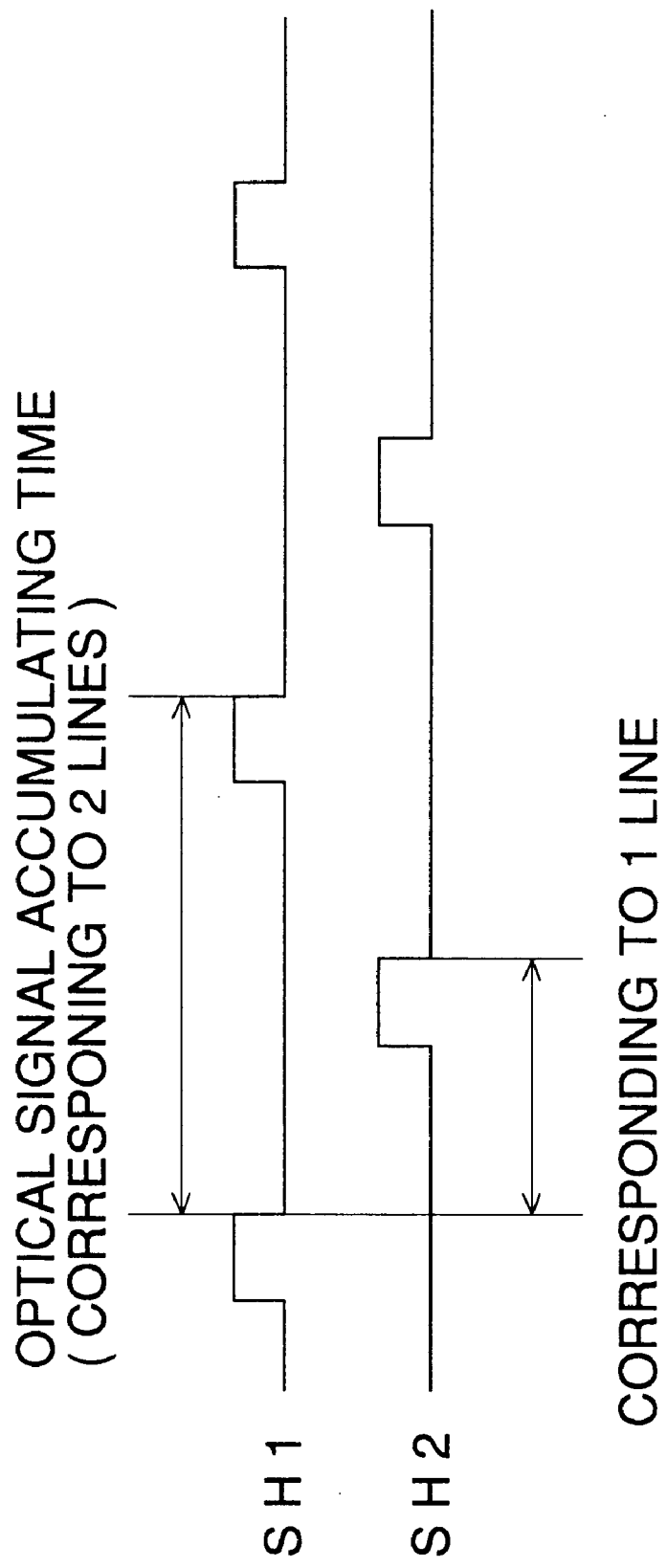
FIG. 14 is a time chart showing an embodiment of reading timing control.

FIG. 14 shows a control means, when the above-mentioned two CCD line censors 109 and 110 read the completely the same position in terms of optic, for reading one-line-shifting data at a prescribed resolution.

For example, when a CCD sensor of 20 MHz movement frequency and 5000 pixela is used, it is necessary that the frequency of control signals SH1 and SH2 of each CCD sensor 109 and 110 is 250, which is the outputting time of one line (time necessary for outputting data for one line), or more (in the case of a single channel). Here, the frequency of the above-mentioned control signals SH1 and SH2 (optical signal accumulation time) is set to be 250 $\mu$s, which is the above-mentioned one-line outputting time.

In addition, conveyance speed (scanning speed in the secondary scanning direction) is set to be 508 mm/s which is double of the 254 mm/s which is considered necessary to read a document at 400 dpi in the secondary scanning direction by one CCD line sensor. In this occasion, resolution of each CCD line sensor 109 and 110 in the secondary scanning direction is reduced to 200 dpi which is half of the initial resolution, since the conveyance speed was doubled.

Here, as shown in FIG. 14, if the phase of control signal SH2 compared to control signal SH1 is shifted by 125 $\mu$s which corresponds to half of the frequency of control signals SH1 and SH2 (optical signal accumulation time), CCD line sensor 110 reads a position which is shifted by one line compared to CCD line sensor 109. Therefore, each CCD line sensor separately reads odd lines or even lines.

Namely, if a case in which an original is read at 400 dpi in the secondary scanning direction by a CCD line sensor of 20 MHz of movement frequency and 5000 pixels the conveyance speed is doubled so that charge (optical signal) for 2 lines in conversion to 400 dpi is accumulated between control signals SH. Therefore, if the phase of control signals SH1 and SH2 (optical signal accumulation term) is shifted by half of the frequency of control signals SH, it means that the reading position is shifted by one line at 400 dpi.

As described above, the resolution of each CCD line in the secondary scanning direction is 200 dpi. However, if the output from each CCD line sensor reads only odd lines or even lines, the resolution of images synthesized becomes 400 dpi. In other words, reading speed (conveyance speed) can be doubled without reducing a given resolution.

In accordance with the above-mentioned method, due to doubling the conveyance method (the scanning speed in the secondary scanning direction), each of CCD sensors 109 and 110 accumulates optical signals for 2 lines. Therefore, image blur occurs as it is. However, if the images are recovered by providing spatial filtering processing in the above-mentioned image processing unit 124, such blur can be eliminated.

However, the above-mentioned spatial filtering processing is limited so that it is difficult completely to recover the images.

Accordingly, it is preferable to use CCD line sensors 109 and 110 equipped with a shutter function and thereby to control charge accumulation time due to the above-mentioned shutter function so that images without image blur in the secondary scanning direction are obtained.

Incidentally, a CCD line sensor equipped with a shutter function is capable of disposing of charges accumulated in photo-sensor unit in a place different from the CCD analogue shift register through a shutter gate.

Figure 15:
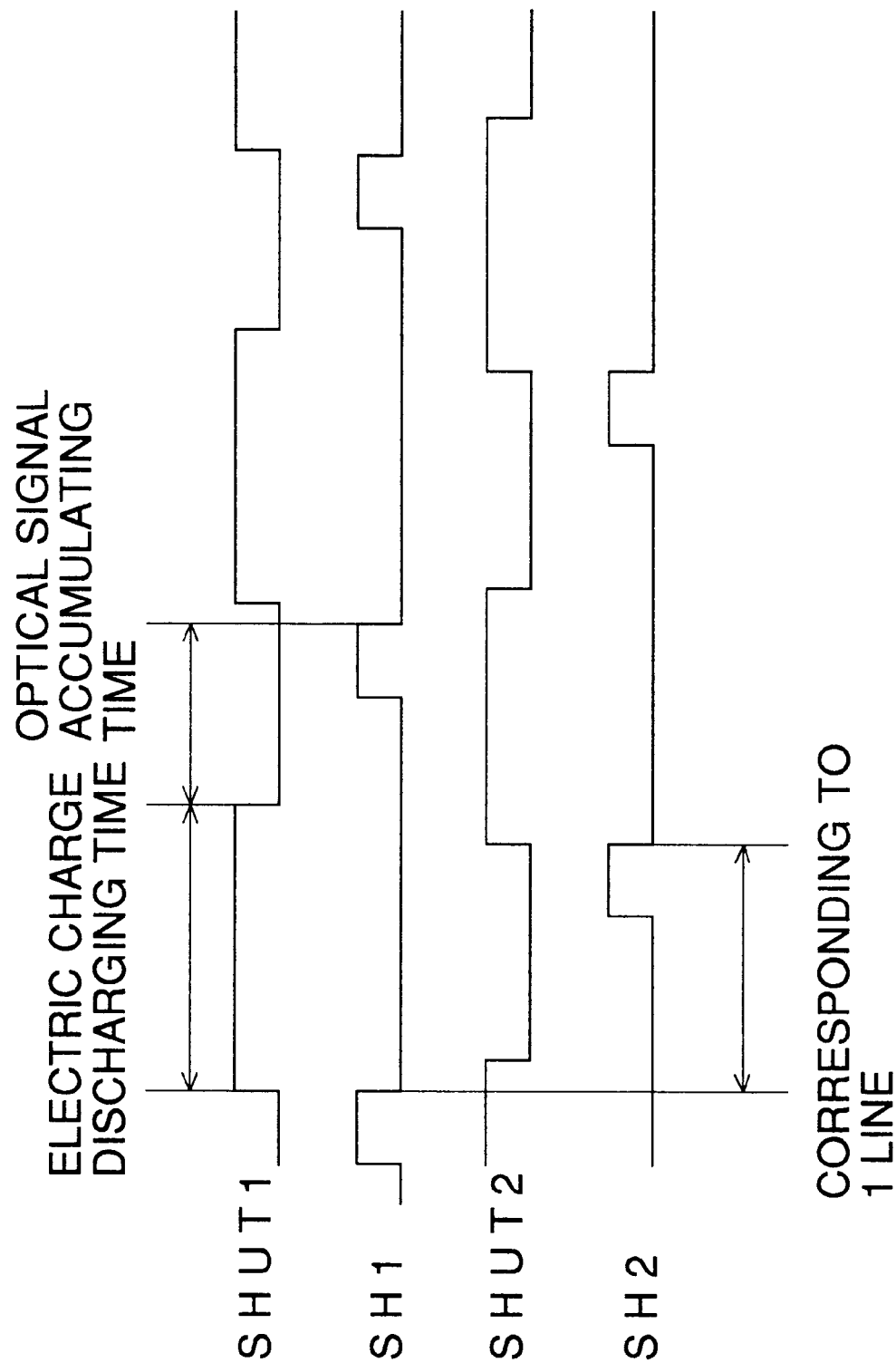
FIG. 15 is a time chart showing an embodiment of the control of optical signal accumulation time using a shutter function.

In FIG. 15, SHUT 1 and SHUT 2 are signals respectively control the shutter gate of CCD line sensors 109 and 110 equipped with a shutter function. When the above-mentioned signals SHUT 1 and SHUT 2 are high, charge in the photo-diode is completely disposed of through the shutter gate so that no charge is accumulated. Therefore, from the moment when SHUT 1 and SHUT 2 are set low, charge starts to be accumulated. When SHUT 1 and SHUT 2 become suficiently high, charge is transferred to the CCD analogue shift register.

If charge accumulation time is controlled in such a manner as to be less than the frequency (one-line outputting frequency) of control signal SH by means of the above-mentioned signals SHUT 1 and 2, time wherein charge is actually accumulated during aforesaid accumulation time is controlled and thereby accumulation of optical signal for 2 lines can be avoided, though conveyance in a secondary scanning direction for 2 lines in conversion to 400 dpi is being conducted. Therefore, due to synthesizing outputting from each CCD line sensors 109 and 110 as data for odd lines and even lines, a blurless image in the secondary scanning direction can be obtained.

In an example shown in FIG. 15, it is s o controlled that charge is accumulated only for a prescribed period by raising the above-mentioned SHUTs 1 and 2 when control signals SH1 and 2 are high, after transferring charge accumulated in the above-mentioned photo-diode to CCD analogue shift register parallelly through a shift gate and that the above-mentioned SHUTs 1 and 2 are fallen at a moment for a prescribed time before the rise time of control signals SH 1 and 2 so that time wherein charge is accumulated is limited to the time corresponding to approximately 1 line in conversion to 400 dpi.

Figure 16:
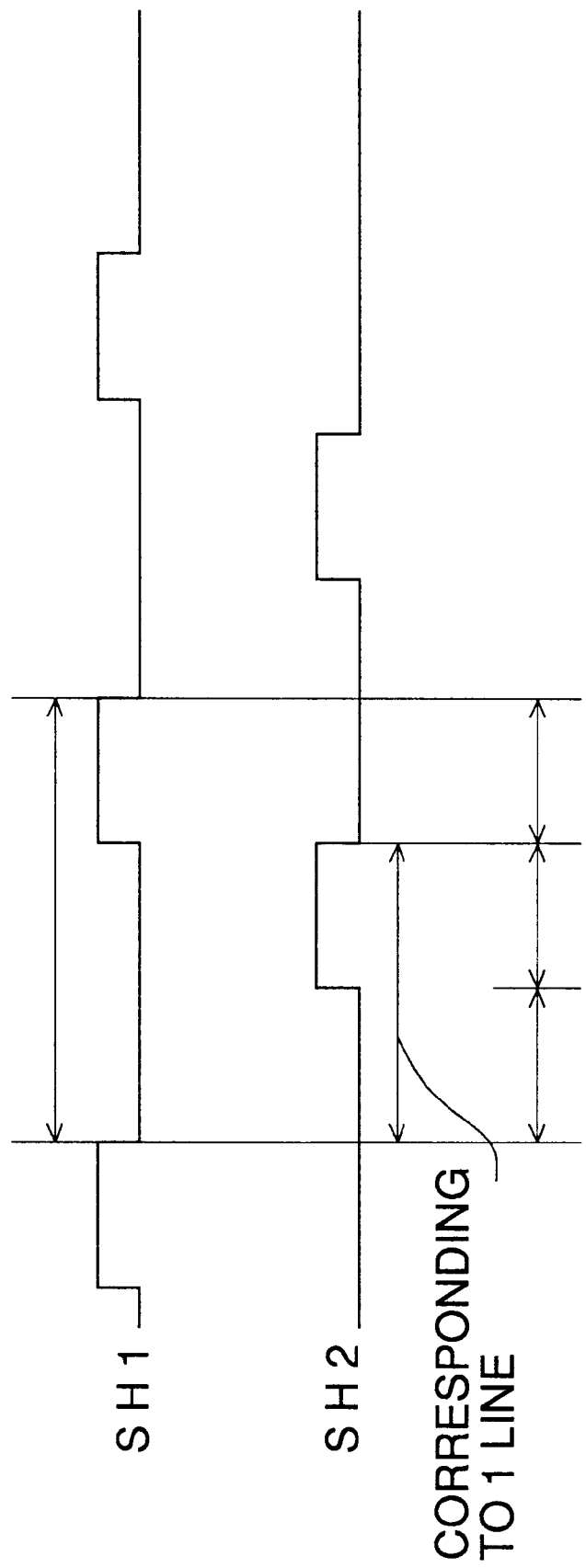
FIG. 16 is a time chart showing an another embodiment of reading timing control.
Figure 17:
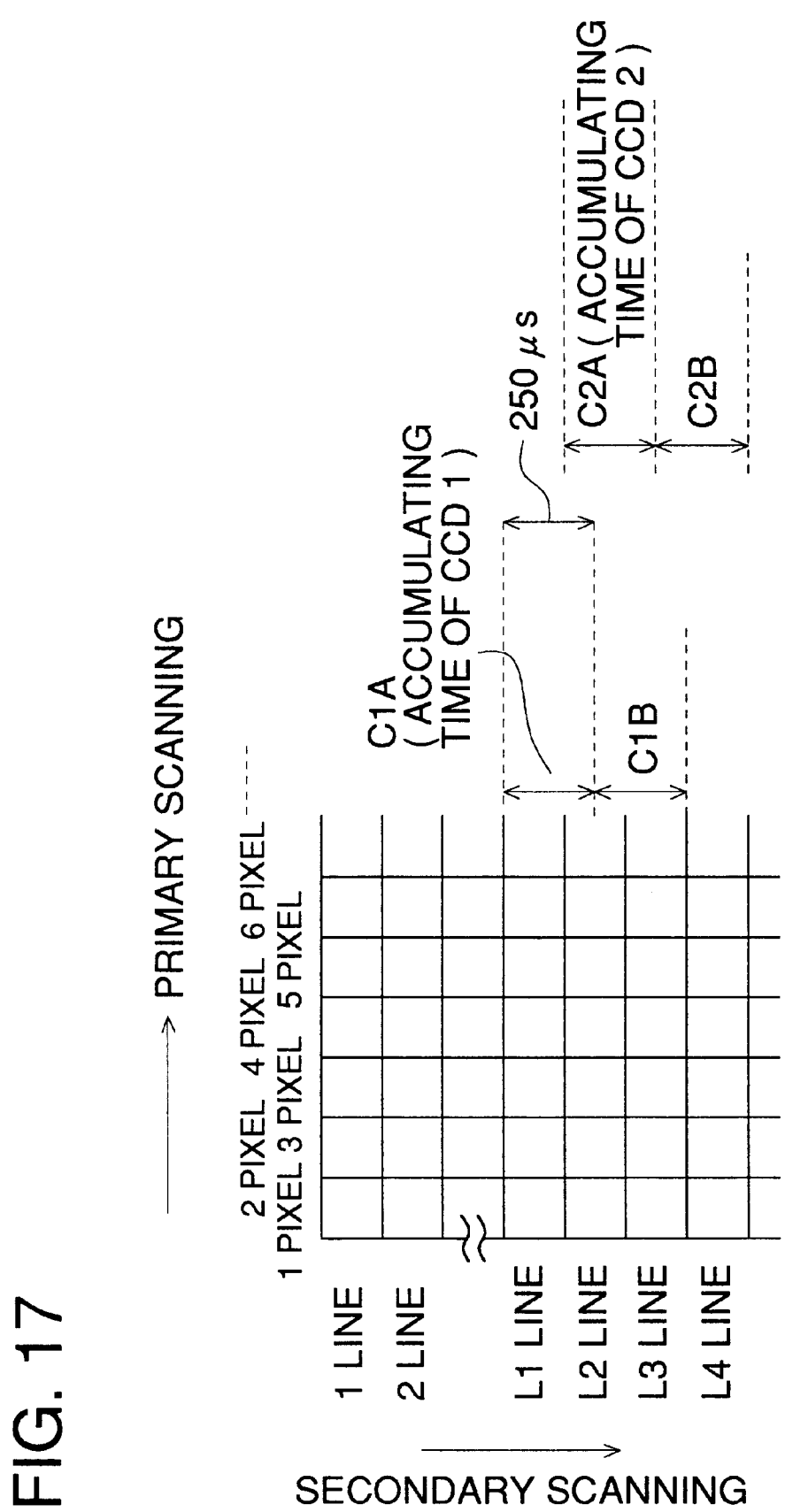
FIG. 17 is a drawing showing relationship between reading timing (accumulation time) and the line.
Figure 18:
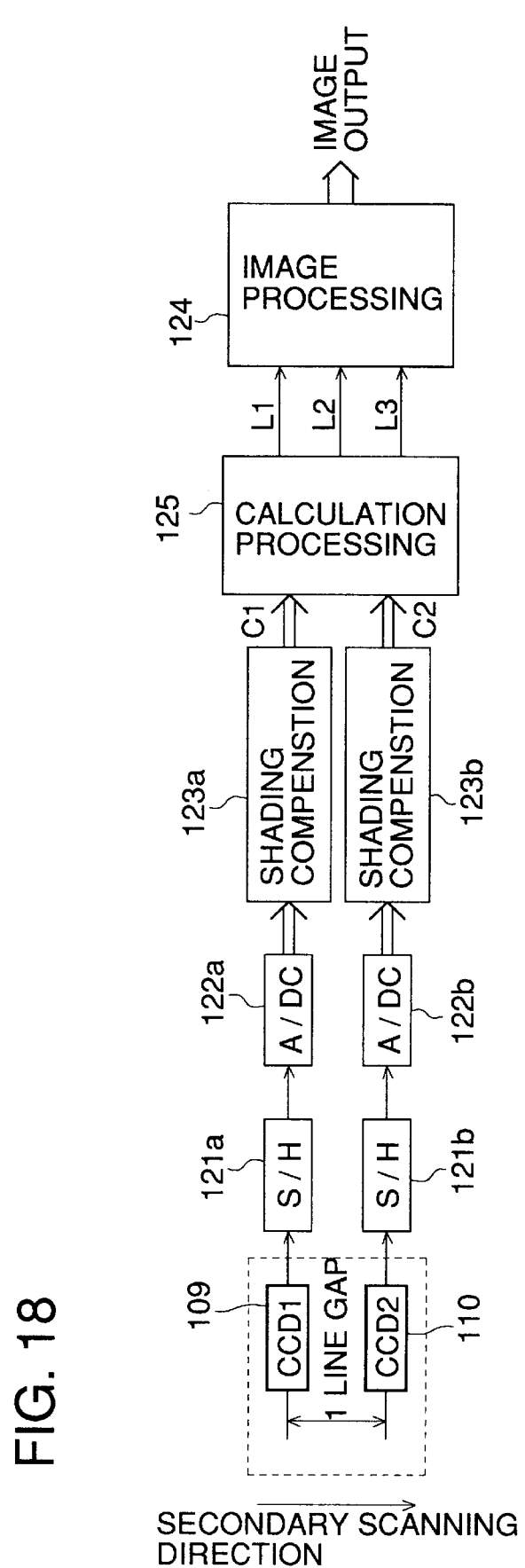
FIG. 18 is a block diagram showing another embodiment of the image processing system.

In addition, when CCD line sensors 109 and 110 are not equipped with shutter function, the occurrence of image blur in the secondary scanning direction can be avoided by a method described in FIGS. 16–18.

FIG. 16 shows a control means in which CCD line sensors 109 and 110 are arranged to read the same position optically.

For example, when a CCD line sensor of 20 MHz and 5000 pixels as stated above and the frequency for control signals SH 1 and 2 is 250 $\mu$s which is the outputting time for one line, 381 mm/sec. which is 1.5 times the conveyance speed of 254 mm/sec. which is regarded to be necessary to read an original at 400 dpi in the secondary scanning direction by one CCD line sensor. In this occasion, resolution of each CCD line sensors 109 and 110 in the secondary scanning direction is 267 dpi. Each CCD line sensor 109 and 110 reads 1.5 lines when converting to 400 dpi. In other words, in light signal accumulation time which is frequency of control signals SH1 and 2, an optical signal for 1.5 lines is accumulated.

In this occasion, for example, light signal accumulation time corresponding to one line in conversion of 400 dpi is $2/3$ of the frequency of control signal SH. Therefore, when CCD line sensor 110 reads a position which is shifted from CCD line sensor 109 by one line by shifting control signal SH2 (accumulation duration of optical signal) compared to control signal SH1 for time corresponds to $2/3$ ($1/1.5$) of aforesaid frequency, i.e., 167 $\mu$s, as shown in the following equation.

Outputting C1A and the next outputting data C1B are represented by $$C1A = L1 + L2/2$$

$$C1B = L2/2 + L3$$

where each line with 400 dpi in the secondary scanning direction is represented as L1, L2, L3 and L4.

Outputting C2A and the next outputting data C2B after CCD line sensor 110 is subjected to shading correction are represented by $$C2A = L2 + L3/2$$

$$C2B = L3/2 + L4$$

From the above-mentioned equations, L1, L2, L3 and L4 are calculated as follows:

$$L1 = C1A + C1B/3 - 2 \times C2A/3$$

$$L2 = -2 \times C1B/3 + 4 \times C2A/3$$

$$L3 = 4 \times C1B/3 - 2 \times C2A/3$$

$$L4 - 2 \times C1B/3 + C2A/3 + C2B$$

Accordingly, due to conducting operations calculating the above-mentioned L1, L2, L3 and L4 in operation processing unit 125 shown in FIG. 18, accurate image data without blurring can be obtained by means of CCD line sensors 109 and 110 not equipped with shutter function, while increasing reading speed by 1.5 times the original one.

Figure 19:
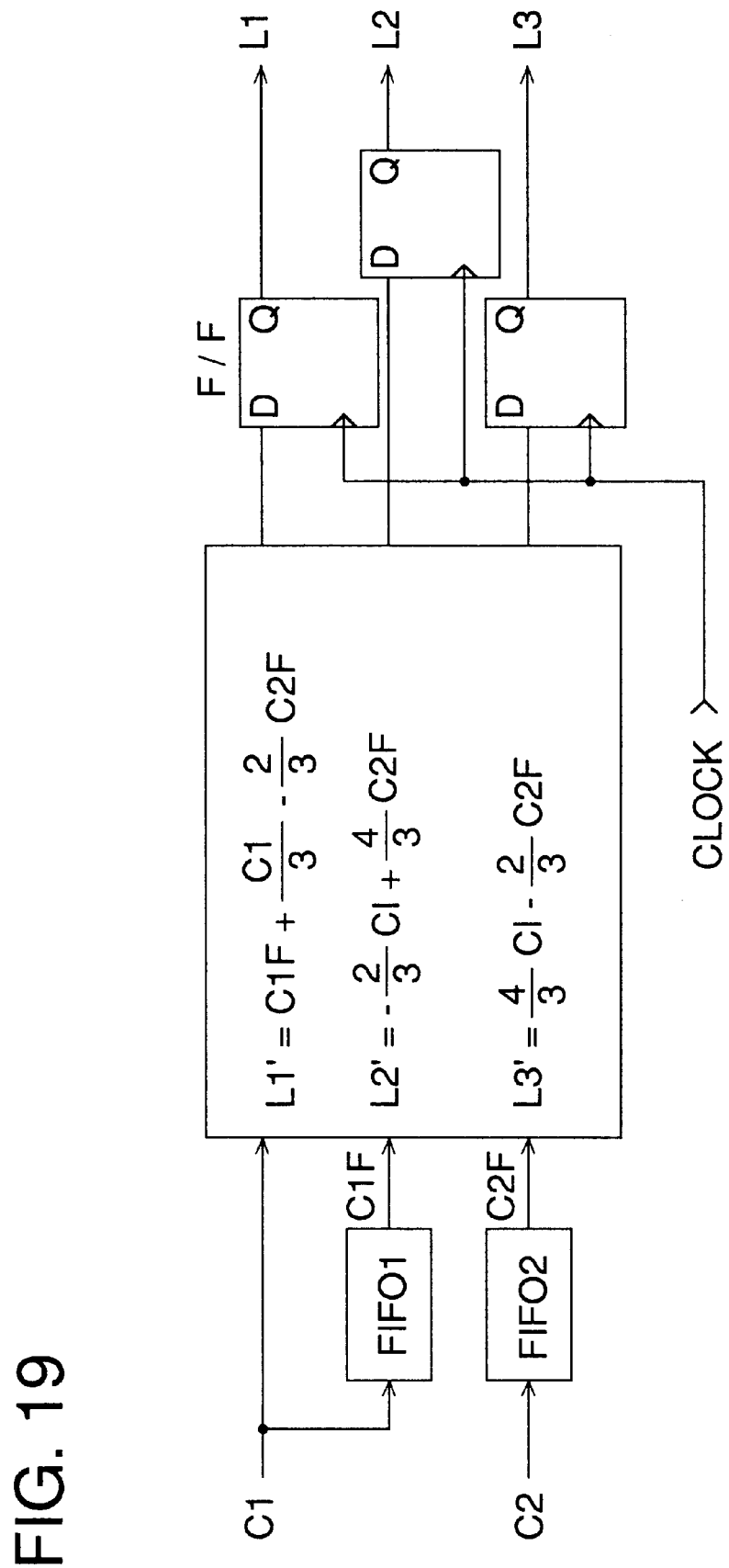
FIG. 19 is a block diagram showing an embodiment of the operation processing unit for operating the output for each line.
Figure 20:
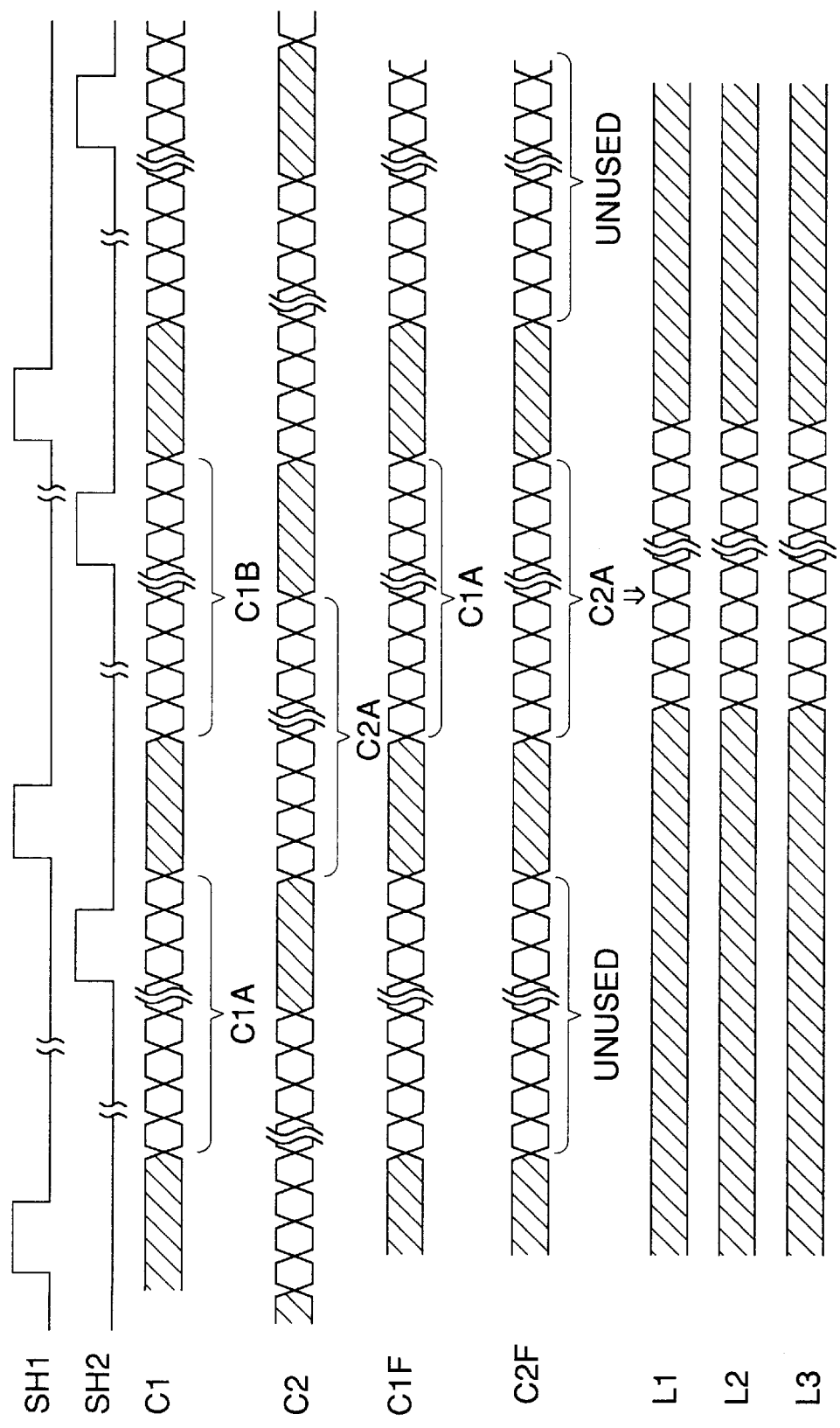
FIG. 20 is a time chart showing the procedure of the operation in the operation processing unit shown in FIG. 19.
Figure 21:
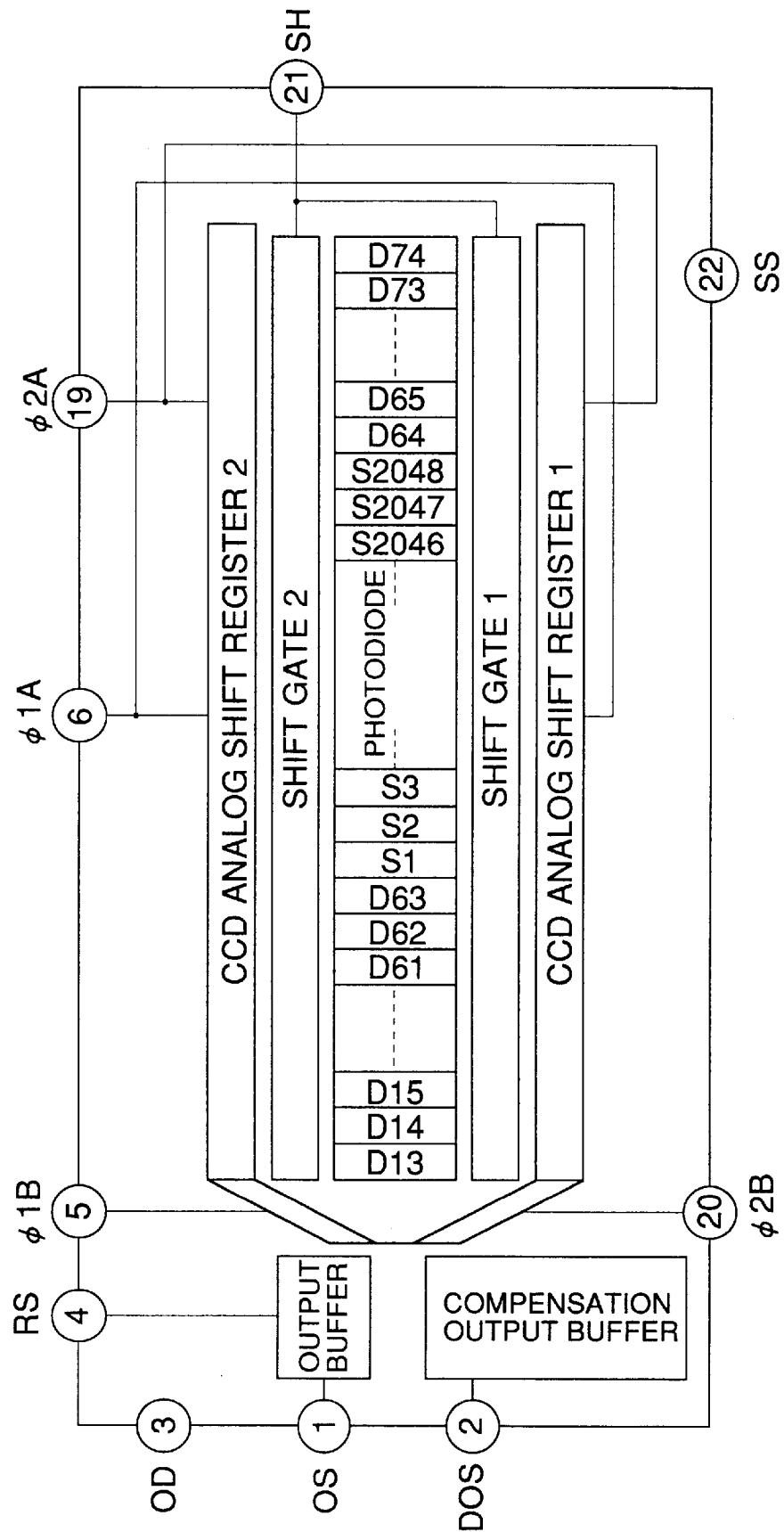
FIG. 21 is a drawing showing a constitution example of the CCD line censor.
Figure 22:
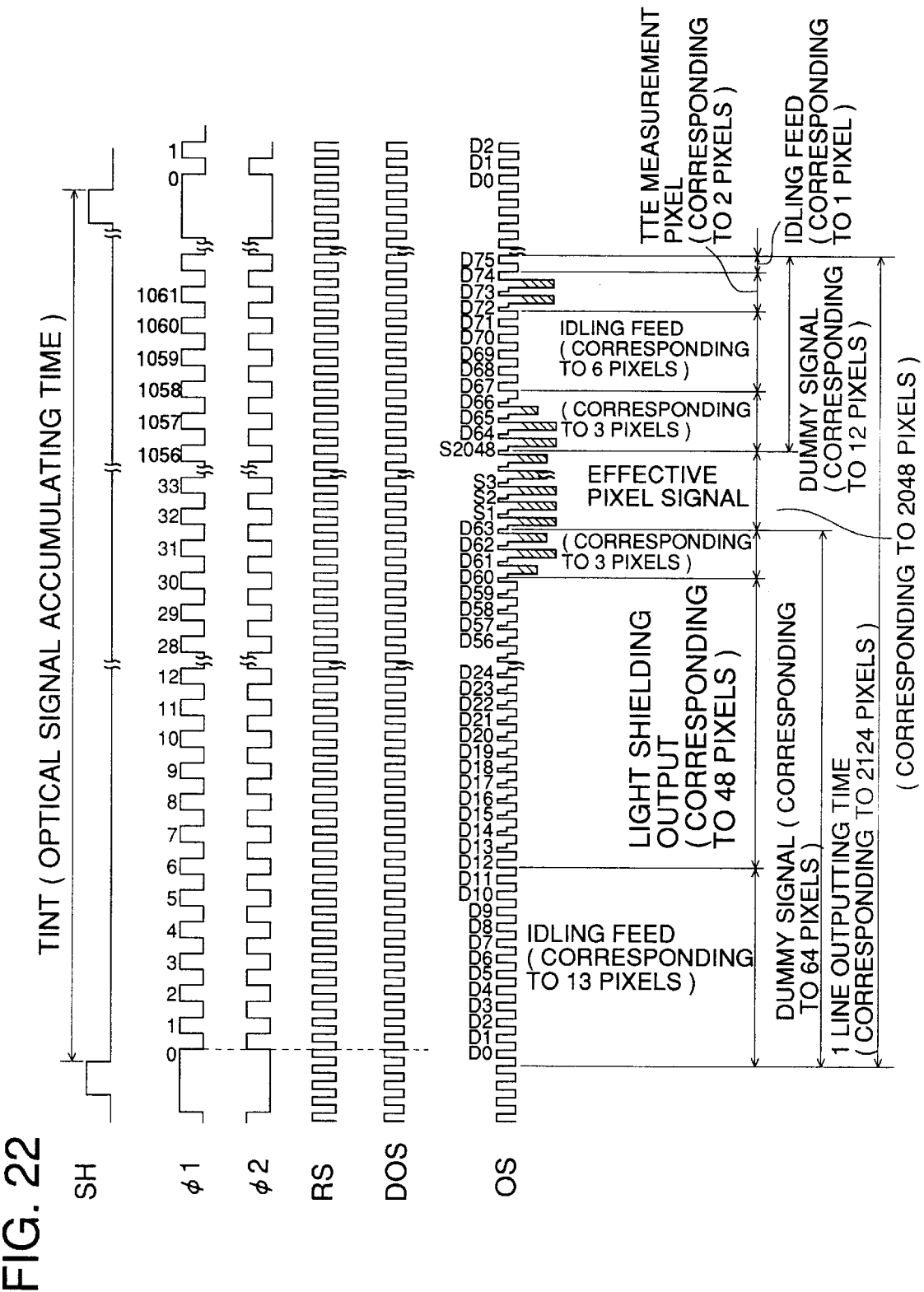
FIG. 22 is a time chart showing an example of control timing in the CCD line censor.
Figure 23:
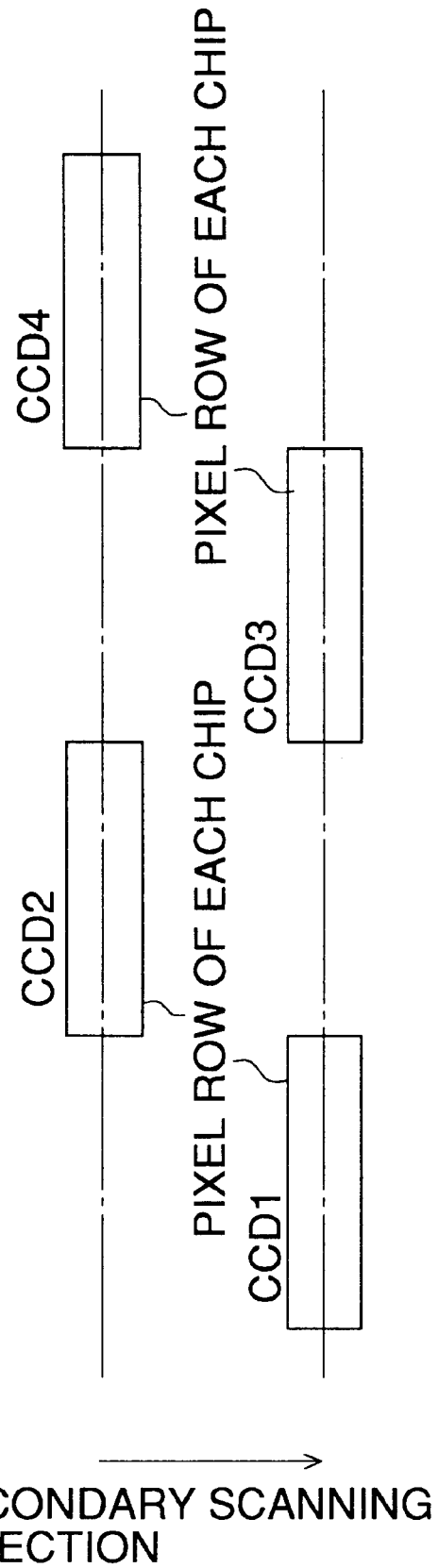
FIG. 23 is a drawing showing a conventional method realizing high speed reading.

FIGS. 19 and 20 show an embodiment of the above-mentioned operation processing unit 125.

Outputted data C1 from CCD line sensor 109 is inputted to FIFO1, and then, it is outputted as C1F by retarding for one line. In the same manner, outputted data C2 from CCD line sensor 110 is inputted to FIFO2, and then is read by aligning the phase with C1. The resulting signal is defined as C2F.

By the use of the above-mentioned signals C1, C1F and C2F, data for L1', L2', and L3' will be calculated in accordance with the following equations which correspond with the above-mentioned equations.

$$L1' = C1F + C1/3 - 2/3 \cdot C2F$$

$$L2' = -2/3 C1 + 4/3 - C2F$$

$$L3' = 4/3 C1 - 2/3 - C2F$$

The above-mentioned data for L1', L2' and L3' are outputted through a flip-flop. They are outputted every two lines on CCD line sensor 109 as line data for L1, L2 and L3.

Incidentally, a structure in which different lines are read in the secondary scanning direction by each one-dimensional image sensor can be realized by a combination of optical position shifting and reading timing shifting.

As explained above, since plural one-dimensional image sensors arranged parallelly in the secondary scanning direction are caused to read different lines, complicated image processing is not necessary. In addition, compared to a case in which one mono-dimensional image sensor reads lines, resolution is not deteriorated and reading speed in the secondary scanning direction is increased.

For example, when two one-dimensional image sensors are used, optical images on odd lines are formed on one of them and optical images on the even lines, which is an adjacent line in so-called resolution, are formed on the other one. Therefore, due to parallel processing of each one-dimensional image sensor, image data on the odd lines and image data on the even lines can concurrently be obtained. Accordingly, reading speed can be enhanced after keeping so-called resolution.

In addition, optically identical images are formed by each of the above-mentioned one-dimensional image sensor. Since reading timing is shifted each other so that each of adjacent line is read at a prescribed resolution. As a result, reading speed can be increased.

In addition, due to combination of optical position sliding and reading timing sliding, each of adjoining lines are read at a prescribed resolution. Accordingly, reading speed can be increased.

In addition, by reflecting a part of the incident beam which is a reflective light from the original by a half mirror and by transmitting another part of it, images can be simply formed on each of plural one-dimensional image sensors.

In addition, by increasing the conveyance speed (scanning speed) in the secondary scanning direction, even when charge accumulation time in each of the one-dimensional image sensor corresponds to plural lines in conversion to a prescribed resolution in the secondary scanning direction, outputting of each line in a prescribed resolution can be calculated from outputting of each of one-dimensional image sensor based on correlation of lines read by each of onedimensional image sensor. Accordingly, blurless images can be obtained.

In addition, by increasing the conveyance speed (scanning speed) in the secondary scanning direction, even when charge accumulation time in each of the one-dimensional image sensors corresponds to plural lines in conversion to a prescribed resolution, image blur can be prevented by shortening substantial charge accumulation time due to the shutter function.

What is claimed is:

1. An image reading apparatus comprising:

a plurality of one-dimensional image sensors each for obtaining two-dimensional original image information by scanning an original in a primary scanning direction while moving relatively to the original in a secondary scanning direction, said secondary scanning direction being a feeding direction of the original which is perpendicular to the primary scanning direction, wherein the image sensors are disposed so that element arrays of the image sensors are arranged in parallel to each other with respect to the secondary direction, wherein the image sensors concurrently read an image of the original on respective pixel lines which are adjacent to each other with respect to the secondary scanning direction, and wherein the image sensors are aligned so as to be optically shifted from each other by a distance between two adjacent lines in the secondary scanning direction corresponding to a resolution in the primary scanning direction obtained by each of the image sensors.

2. An image reading apparatus comprising:

a plurality of one-dimensional image sensors each for obtaining two-dimensional original image information by scanning an original in a primary scanning direction while moving relatively to the original in a secondary scanning direction, said secondary scanning direction being a feeding direction of the original which is perpendicular to the primary scanning direction, wherein the image sensors are disposed so that element arrays of the image sensors are arranged in parallel to each other with respect to the secondary direction, wherein the image sensors concurrently read an image of the original on respective pixel lines which are adjacent to each other with respect to the secondary scanning direction, and wherein an identical optical image is formed on each of the image sensors and respective reading timings of each of the image sensors are shifted from each other, so that the image sensors read the image of the original at positions which are shifted from each other by a distance between two adjacent lines in the secondary scanning direction corresponding to a resolution in the primary scanning direction obtained by each of the image sensors.

3. The image reading apparatus of claim 2, further comprising a plurality of half mirrors, each provided between the original and each of the image sensors, for focussing light reflected from the original onto each of the image sensors.

4. The image reading apparatus of claim 2, wherein a scanning speed of each of the image sensors in the secondary scanning direction is n times a speed corresponding to a resolution in the primary scanning direction which can be obtained with a single image sensor, and an output corresponding to said distance between two adjacent lines in the secondary scanning direction is calculated based on an output from each of the image sensors.

5. The image reading apparatus of claim 2, wherein each of the image sensors is a charge coupled device having a shutter function by means of which an accumulation time of optical signals in the charge coupled device is made shorter than an output cycle for one line.

6. An image reading apparatus comprising:

a plurality of one-dimensional image sensors each for obtaining two-dimensional original image information by scanning an original in a primary scanning direction while moving relatively to the original in a secondary scanning direction, said secondary scanning direction being a feeding direction of the original which is perpendicular to the primary scanning direction, wherein the image sensors are disposed so that element arrays of the image sensors are arranged in parallel to each other with respect to the secondary direction, wherein the image sensors concurrently read an image of the original on respective pixel lines which are adjacent to each other with respect to the secondary scanning direction, and wherein the image sensors are aligned so as to be optically shifted from each other and respective reading timings of each of the image sensors are shifted from each other, so that the image sensors read the image of the original at positions which are shifted from each other by a distance between two adjacent lines in the secondary scanning direction corresponding to a resolution in the primary scanning direction obtained by each of the image sensors.

7. An image reading apparatus comprising:

(a) a plurality of one-dimensional image sensors each for obtaining two-dimensional original image information by scanning an original in a primary scanning direction while moving relatively to the original in a secondary scanning direction, said secondary scanning direction being a feeding direction of the original which is perpendicular to the primary scanning direction, wherein the image sensors are disposed so that element arrays of the image sensors are arranged in parallel to each other with respect to the secondary direction, wherein the image sensors concurrently read an image of the original on respective pixel lines which are adjacent to each other with respect to the secondary scanning direction; and (b) an image processing means for concurrently processing odd numbered line data and even numbered line data, wherein image data of at least two adjacent lines are concurrently inputted to the image processing means, and two or more image operation elements realizing a same function share a line memory for keeping image date separate from each other in order to conduct an image processing operation with respect to a pixel aggregate including N pixels×L lines, where both N and L are natural numbers.

8. An image reading apparatus comprising:

(a) a plurality of one-dimensional image sensors each for obtaining two-dimensional original image information by scanning an original in a primary scanning direction while moving relatively to the original in a secondary scanning direction, said secondary scanning direction being a feeding direction of the original which is perpendicular to the primary scanning direction, wherein the image sensors are disposed so that element arrays of the image sensors are arranged in parallel to each other with respect to the secondary direction, wherein the image sensors concurrently read an image of the original on respective pixel lines which are adjacent to each other with respect to the secondary scanning direction;

(b) an image processing means for concurrently processing odd numbered line data and even numbered line data; and (c) an outputting device for recording images using two laser diodes in accordance with data outputted from the image processing means, wherein a first one of the two laser diodes for odd numbered lines is controlled based on the odd numbered line data, and a second one of the two laser diodes for even numbered lines is controlled based on the even numbered line data.

9. The image processing apparatus of claim 5, wherein at least two or more lines are provided for a line memory for the odd numbered lines and a line memory for the even numbered lines, and wherein image data synchronizing with a clock for image processing used in the image processing means is converted to a clock for recording which controls the two laser diodes.

* * * * *